United States Patent
Nachimuthu et al.

(10) Patent No.: US 11,354,053 B2
(45) Date of Patent: *Jun. 7, 2022

(54) TECHNOLOGIES FOR LIFECYCLE MANAGEMENT WITH REMOTE FIRMWARE

(71) Applicant: Intel Corporation, Santa Clara, CA (US)

(72) Inventors: Murugasamy K. Nachimuthu, Beaverton, OR (US); Mohan J. Kumar, Aloha, OR (US)

(73) Assignee: Intel Corporation, Santa Clara, CA (US)

( * ) Notice: Subject to any disclaimer, the term of this patent is extended or adjusted under 35 U.S.C. 154(b) by 5 days.

This patent is subject to a terminal disclaimer.

(21) Appl. No.: 17/005,879

(22) Filed: Aug. 28, 2020

(65) Prior Publication Data
US 2020/0393986 A1 Dec. 17, 2020

Related U.S. Application Data

(63) Continuation of application No. 15/824,604, filed on Nov. 28, 2017, now Pat. No. 10,795,595.
(Continued)

(30) Foreign Application Priority Data
Aug. 30, 2017 (IN) .............................. 201741030632

(51) Int. Cl.
*G06F 3/06* (2006.01)
*G06F 16/174* (2019.01)
(Continued)

(52) U.S. Cl.
CPC .......... *G06F 3/0641* (2013.01); *G06F 3/0604* (2013.01); *G06F 3/065* (2013.01);
(Continued)

(58) Field of Classification Search
CPC ........ G06F 8/65; G06F 21/572; G06F 9/4401; G06F 8/654; G06F 3/0641; G06F 8/656;
(Continued)

(56) References Cited

U.S. PATENT DOCUMENTS 7,055,148 B2   5/2006   Marsh et al.
7,987,449 B1   7/2011   Marolia et al.
(Continued)

OTHER PUBLICATIONS

Catalin Bujdei et al.; Seeeduinoboot: an Advanced Bootloader for Seeeduino Stalker v2 Platforms, Allowing Remote Firmware Update; Springer; pp. 131-144; retrieved on Jan. 14, 2022 (Year: 2014).*
Lionel Morel et al.; Idols with Feet of Clay: On the Security of Bootloaders and Firmware Updaters for the IoT; IEEE; 4 pages; retrieved on Jan. 14, 2022 (Year: 2022).*
(Continued)

*Primary Examiner* — S. Sough
*Assistant Examiner* — Cuong V Luu
(74) *Attorney, Agent, or Firm* — Compass IP Law PC

(57) ABSTRACT

Technologies for lifecycle management include multiple computing devices in communication with a lifecycle management server. On boot-up, a computing device loads a lightweight firmware boot environment. The lightweight firmware boot environment connects to the lifecycle management server and downloads one or more firmware images for controllers of the computing device. The controllers includes baseboard management controllers, network interface controllers, solid-state drive controllers, or other controllers. The lifecycle management server selects firmware images and/or versions of firmware images based on the controllers or the computing device. The computing device installs each firmware image to a controller memory device coupled to a controller, and in use, each controller accesses the firmware image in the controller memory device.

22 Claims, 15 Drawing Sheets

Related U.S. Application Data

(60) Provisional application No. 62/584,401, filed on Nov. 10, 2017, provisional application No. 62/427,268, filed on Nov. 29, 2016.

(51) Int. Cl.
| | |
|---|---|
| G06F 21/57 | (2013.01) |
| G06F 21/73 | (2013.01) |
| G06F 8/65 | (2018.01) |
| H04L 41/0816 | (2022.01) |
| H04L 41/0853 | (2022.01) |
| H04L 41/12 | (2022.01) |
| H04L 67/10 | (2022.01) |
| G06F 11/30 | (2006.01) |
| G06F 9/50 | (2006.01) |
| H01R 13/453 | (2006.01) |
| G06F 9/48 | (2006.01) |
| G06F 9/455 | (2018.01) |
| H05K 7/14 | (2006.01) |
| H03M 7/30 | (2006.01) |
| H03M 7/40 | (2006.01) |
| H04L 43/08 | (2022.01) |
| H04L 47/20 | (2022.01) |
| H04L 47/2441 | (2022.01) |
| G06F 11/07 | (2006.01) |
| G06F 11/34 | (2006.01) |
| G06F 7/06 | (2006.01) |
| G06T 9/00 | (2006.01) |
| H03M 7/42 | (2006.01) |
| H04L 12/28 | (2006.01) |
| H04L 12/46 | (2006.01) |
| H04L 61/5007 | (2022.01) |
| G06F 13/16 | (2006.01) |
| G06F 21/62 | (2013.01) |
| G06F 21/76 | (2013.01) |
| H03K 19/173 | (2006.01) |
| H04L 9/08 | (2006.01) |
| H04L 41/044 | (2022.01) |
| H04L 49/104 | (2022.01) |
| H04L 67/63 | (2022.01) |
| H04L 67/75 | (2022.01) |
| H04L 43/04 | (2022.01) |
| H04L 43/06 | (2022.01) |
| H04L 43/0894 | (2022.01) |
| G06F 9/38 | (2018.01) |
| G06F 12/02 | (2006.01) |
| G06F 12/06 | (2006.01) |
| G06T 1/20 | (2006.01) |
| G06T 1/60 | (2006.01) |
| G06F 9/54 | (2006.01) |
| H04L 67/1014 | (2022.01) |
| G06F 8/656 | (2018.01) |
| G06F 8/658 | (2018.01) |
| G06F 8/654 | (2018.01) |
| G06F 9/4401 | (2018.01) |
| H01R 13/631 | (2006.01) |
| H04L 47/78 | (2022.01) |
| G06F 16/28 | (2019.01) |
| H04Q 11/00 | (2006.01) |
| G06F 11/14 | (2006.01) |
| H04L 41/046 | (2022.01) |
| H04L 41/0896 | (2022.01) |
| H04L 41/142 | (2022.01) |
| H04L 9/40 | (2022.01) |
| G06F 15/80 | (2006.01) |

(52) U.S. Cl.
CPC ............ *G06F 3/067* (2013.01); *G06F 3/0608* (2013.01); *G06F 3/0611* (2013.01); *G06F 3/0613* (2013.01); *G06F 3/0617* (2013.01); *G06F 3/0647* (2013.01); *G06F 3/0653* (2013.01); *G06F 7/06* (2013.01); *G06F 8/65* (2013.01); *G06F 8/654* (2018.02); *G06F 8/656* (2018.02); *G06F 8/658* (2018.02); *G06F 9/3851* (2013.01); *G06F 9/3891* (2013.01); *G06F 9/4401* (2013.01); *G06F 9/45533* (2013.01); *G06F 9/4843* (2013.01); *G06F 9/4881* (2013.01); *G06F 9/505* (2013.01); *G06F 9/5005* (2013.01); *G06F 9/5038* (2013.01); *G06F 9/5044* (2013.01); *G06F 9/5083* (2013.01); *G06F 9/544* (2013.01); *G06F 11/079* (2013.01); *G06F 11/0709* (2013.01); *G06F 11/0751* (2013.01); *G06F 11/3006* (2013.01); *G06F 11/3034* (2013.01); *G06F 11/3055* (2013.01); *G06F 11/3079* (2013.01); *G06F 11/3409* (2013.01); *G06F 12/0284* (2013.01); *G06F 12/0692* (2013.01); *G06F 13/1652* (2013.01); *G06F 16/1744* (2019.01); *G06F 21/57* (2013.01); *G06F 21/6218* (2013.01); *G06F 21/73* (2013.01); *G06F 21/76* (2013.01); *G06T 1/20* (2013.01); *G06T 1/60* (2013.01); *G06T 9/005* (2013.01); *H01R 13/453* (2013.01); *H01R 13/4536* (2013.01); *H01R 13/4538* (2013.01); *H01R 13/631* (2013.01); *H03K 19/1731* (2013.01); *H03M 7/3084* (2013.01); *H03M 7/40* (2013.01); *H03M 7/42* (2013.01); *H03M 7/60* (2013.01); *H03M 7/6011* (2013.01); *H03M 7/6017* (2013.01); *H03M 7/6029* (2013.01); *H04L 9/0822* (2013.01); *H04L 12/2881* (2013.01); *H04L 12/4633* (2013.01); *H04L 41/044* (2013.01); *H04L 41/0816* (2013.01); *H04L 41/0853* (2013.01); *H04L 41/12* (2013.01); *H04L 43/04* (2013.01); *H04L 43/06* (2013.01); *H04L 43/08* (2013.01); *H04L 43/0894* (2013.01); *H04L 47/20* (2013.01); *H04L 47/2441* (2013.01); *H04L 49/104* (2013.01); *H04L 61/2007* (2013.01); *H04L 67/10* (2013.01); *H04L 67/1014* (2013.01); *H04L 67/327* (2013.01); *H04L 67/36* (2013.01); *H05K 7/1452* (2013.01); *H05K 7/1487* (2013.01); *H05K 7/1491* (2013.01); *G06F 11/1453* (2013.01); *G06F 12/023* (2013.01); *G06F 15/80* (2013.01); *G06F 16/285* (2019.01); *G06F 2212/401* (2013.01); *G06F 2212/402* (2013.01); *G06F 2221/2107* (2013.01); *H04L 41/046* (2013.01); *H04L 41/0896* (2013.01); *H04L 41/142* (2013.01); *H04L 47/78* (2013.01); *H04L 63/1425* (2013.01); *H04Q 11/0005* (2013.01); *H05K 7/1447* (2013.01); *H05K 7/1492* (2013.01)

(58) Field of Classification Search
CPC .... G06F 8/658; G06F 16/1744; G06F 3/0604; G06F 3/0608; G06F 3/0611; G06F 3/0613; G06F 3/0617; G06F 3/0647; G06F 3/065; G06F 3/0653; G06F 3/067; G06F 7/06; G06F 9/3851; G06F 9/3891; G06F 9/45533; G06F 9/4843; G06F 9/4881; G06F 9/5005; G06F 9/5038; G06F 9/5044; G06F 9/505; G06F 9/5083;

G06F 9/544; G06F 11/0709; G06F 11/0751; G06F 11/079; G06F 11/3006; G06F 11/3034; G06F 11/3055; G06F 11/3079; G06F 11/3409; G06F 12/0284; G06F 12/0692; G06F 13/1652; G06F 21/57; G06F 21/6218; G06F 21/73; G06F 21/76; G06F 11/1453; G06F 12/023; G06F 15/80; G06F 2212/401; G06F 2212/402; G06F 2221/2107; G06T 1/20; G06T 1/06; G06T 9/005; H01R 13/453; H01R 13/4536; H01R 13/4538; H01R 13/631; H03K 19/1731; H03M 7/3084; H03M 7/40; H03M 7/42; H03M 7/60; H03M 7/6011; H03M 7/6017; H03M 7/6029; H04L 9/0822; H04L 12/2881; H04L 12/4633; H04L 41/044; H04L 41/0816; H04L 41/0853; H04L 41/12; H04L 43/04; H04L 43/06; H04L 43/08; H04L 43/0894; H04L 47/20; H04L 47/2441; H04L 49/104; H04L 61/2007; H04L 67/10; H04L 67/1014; H04L 67/327; H04L 67/36; H04L 41/046; H04L 41/0896; H04L 41/142; H04L 47/78; H04L 63/1425; H05K 7/1452; H05K 7/1487

See application file for complete search history.

(56) References Cited

U.S. PATENT DOCUMENTS

| 8,745,614 | B2 | 6/2014 | Banerjee et al. |
| 9,734,311 | B1 | 8/2017 | Righi et al. |
| 10,324,706 | B1 | 6/2019 | Schrader et al. |
| 2004/0123086 | A1 | 6/2004 | Rothman et al. |
| 2015/0019800 | A1 | 1/2015 | Ramirez et al. |
| 2016/0188313 | A1* | 6/2016 | Dubai ............... G06F 8/654 |
| | | | 717/172 |
| 2016/0196131 | A1 | 7/2016 | Searle et al. |
| 2016/0202964 | A1 | 7/2016 | Butcher et al. |
| 2016/0378990 | A1 | 12/2016 | Goodman et al. |
| 2017/0010899 | A1 | 1/2017 | Dasar et al. |
| 2017/0114625 | A1 | 4/2017 | Norris et al. |
| 2017/0131991 | A1* | 5/2017 | Su ..................... G06F 8/654 |
| 2017/0337051 | A1 | 11/2017 | Bertani et al. |
| 2018/0096154 | A1 | 4/2018 | Shivanna et al. |
| 2018/0165082 | A1 | 6/2018 | Batchelor et al. |
| 2019/0250897 | A1 | 8/2019 | Gore et al. |

OTHER PUBLICATIONS

First Office Action for U.S. Appl. No. 15/824,604, dated Jan. 27, 2020, 19 pages.

Notice of Allowance for U.S. Appl. No. 15/824,604, dated Jun. 2, 2020, 9 pages.

* cited by examiner

TECHNOLOGIES FOR LIFECYCLE MANAGEMENT WITH REMOTE FIRMWARE

CROSS-REFERENCE TO RELATED APPLICATIONS

This application is a continuation application of U.S. application Ser. No. 15/824,604, entitled "TECHNOLOGIES FOR LIFECYCLE MANAGEMENT WITH REMOTE FIRMWARE," which was filed on Nov. 28, 2017, and which claims the benefit of U.S. Provisional Patent Application No. 62/427,268, filed Nov. 29, 2016 and Indian Provisional Patent Application No. 201741030632, filed Aug. 30, 2017.

BACKGROUND

Typical computing devices such as servers include multiple controllers such as solid state drive (SSD) controllers, baseboard management controllers (BMCs), network interface controllers (NICs), or other controllers. Each controller may access firmware stored in a flash memory device. Controller firmware is typically updated manually by an administrator using direct console access.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

Figure 1:
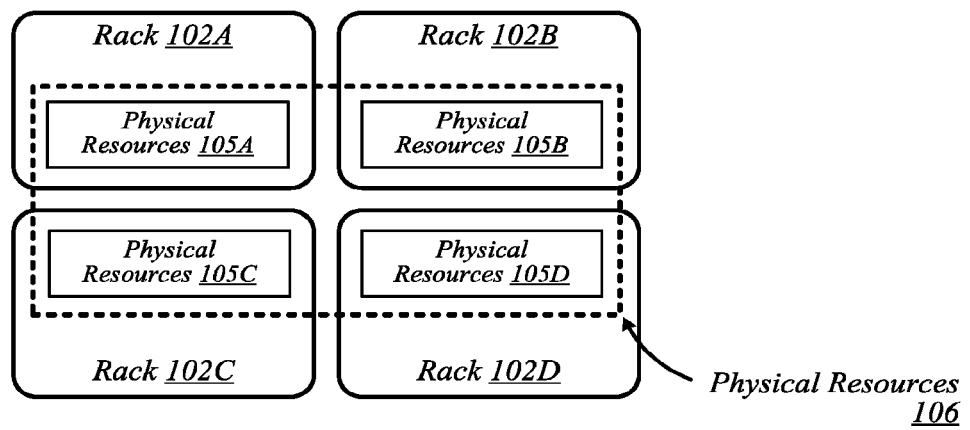
FIG. 1 is a diagram of a conceptual overview of a data center in which one or more techniques described herein may be implemented according to various embodiments.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

The disclosed embodiments may be implemented, in some cases, in hardware, firmware, software, or any combination thereof. The disclosed embodiments may also be implemented as instructions carried by or stored on a transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

FIG. 1 illustrates a conceptual overview of a data center 100 that may generally be representative of a data center or other type of computing network in/for which one or more techniques described herein may be implemented according to various embodiments. As shown in FIG. 1, data center 100 may generally contain a plurality of racks, each of which may house computing equipment comprising a respective set of physical resources. In the particular non-limiting example depicted in FIG. 1, data center 100 contains four racks 102A to 102D, which house computing equipment comprising respective sets of physical resources 105A to 105D. According to this example, a collective set of physical resources 106 of data center 100 includes the various sets of physical resources 105A to 105D that are distributed among racks 102A to 102D. Physical resources 106 may include resources of multiple types, such as—for example—processors, co-processors, accelerators, field-programmable gate arrays (FPGAs), memory, and storage. The embodiments are not limited to these examples.

The illustrative data center 100 differs from typical data centers in many ways. For example, in the illustrative embodiment, the circuit boards ("sleds") on which components such as CPUs, memory, and other components are placed are designed for increased thermal performance. In particular, in the illustrative embodiment, the sleds are shallower than typical boards. In other words, the sleds are shorter from the front to the back, where cooling fans are located. This decreases the length of the path that air must to travel across the components on the board. Further, the components on the sled are spaced further apart than in typical circuit boards, and the components are arranged to reduce or eliminate shadowing (i.e., one component in the air flow path of another component). In the illustrative embodiment, processing components such as the processors are located on a top side of a sled while near memory, such as dual inline memory modules (DIMMs), are located on a bottom side of the sled. As a result of the enhanced airflow provided by this design, the components may operate at higher frequencies and power levels than in typical systems, thereby increasing performance. Furthermore, the sleds are configured to blindly mate with power and data communication cables in each rack 102A, 102B, 102C, 102D, enhancing their ability to be quickly removed, upgraded, reinstalled, and/or replaced. Similarly, individual components located on the sleds, such as processors, accelerators, memory, and data storage drives, are configured to be easily upgraded due to their increased spacing from each other. In the illustrative embodiment, the components additionally include hardware attestation features to prove their authenticity.

Furthermore, in the illustrative embodiment, the data center 100 utilizes a single network architecture ("fabric") that supports multiple other network architectures including Ethernet and Omni-Path. The sleds, in the illustrative embodiment, are coupled to switches via optical fibers, which provide higher bandwidth and lower latency than typical twisted pair cabling (e.g., Category 5, Category 5e, Category 6, etc.). Due to the high bandwidth, low latency interconnections and network architecture, the data center 100 may, in use, pool resources, such as memory, accelerators (e.g., graphics accelerators, FPGAs, application-specific integrated circuits (ASICs), etc.), and data storage drives that are physically disaggregated, and provide them to compute resources (e.g., processors) on an as needed basis, enabling the compute resources to access the pooled resources as if they were local. The illustrative data center 100 additionally receives usage information for the various resources, predicts resource usage for different types of workloads based on past resource usage, and dynamically reallocates the resources based on this information.

The racks 102A, 102B, 102C, 102D of the data center 100 may include physical design features that facilitate the automation of a variety of types of maintenance tasks. For example, data center 100 may be implemented using racks that are designed to be robotically-accessed, and to accept and house robotically-manipulatable resource sleds. Furthermore, in the illustrative embodiment, the racks 102A, 102B, 102C, 102D include integrated power sources that receive a greater voltage than is typical for power sources. The increased voltage enables the power sources to provide additional power to the components on each sled, enabling the components to operate at higher than typical frequencies.

Figure 2:
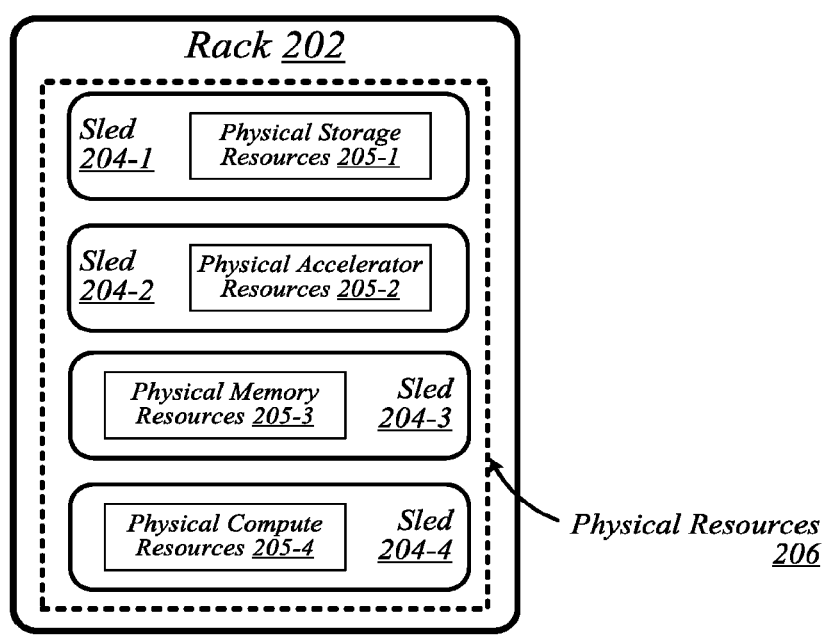
FIG. 2 is a diagram of an example embodiment of a logical configuration of a rack of the data center of FIG. 1.

FIG. 2 illustrates an exemplary logical configuration of a rack 202 of the data center 100. As shown in FIG. 2, rack 202 may generally house a plurality of sleds, each of which may comprise a respective set of physical resources. In the particular non-limiting example depicted in FIG. 2, rack 202 houses sleds 204-1 to 204-4 comprising respective sets of physical resources 205-1 to 205-4, each of which constitutes a portion of the collective set of physical resources 206 comprised in rack 202. With respect to FIG. 1, if rack 202 is representative of—for example—rack 102A, then physical resources 206 may correspond to the physical resources 105A comprised in rack 102A. In the context of this example, physical resources 105A may thus be made up of the respective sets of physical resources, including physical storage resources 205-1, physical accelerator resources 205-2, physical memory resources 205-3, and physical compute resources 205-5 comprised in the sleds 204-1 to 204-4 of rack 202. The embodiments are not limited to this example. Each sled may contain a pool of each of the various types of physical resources (e.g., compute, memory, accelerator, storage). By having robotically accessible and robotically manipulatable sleds comprising disaggregated resources, each type of resource can be upgraded independently of each other and at their own optimized refresh rate.

Figure 3:
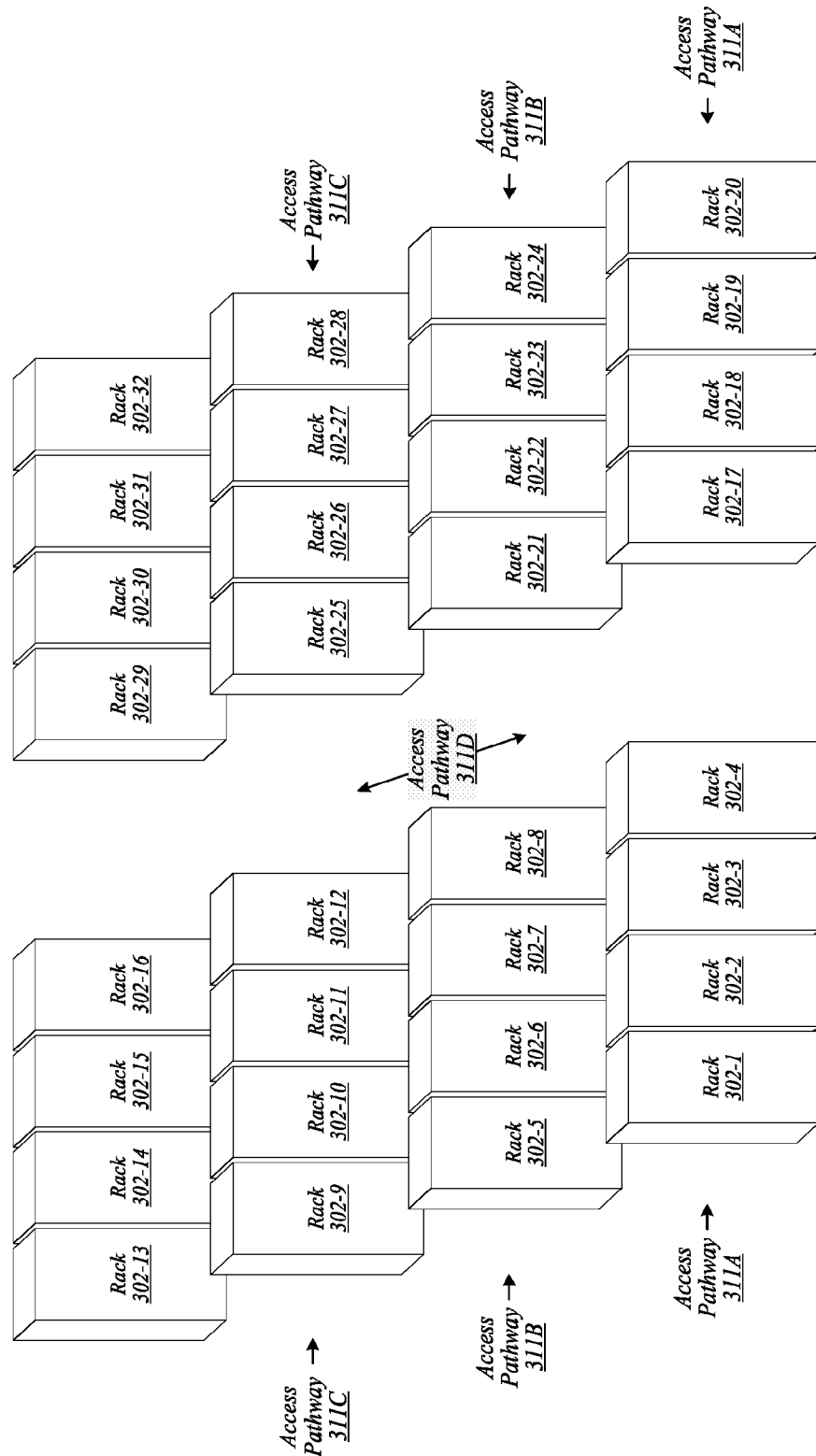
FIG. 3 is a diagram of an example embodiment of another data center in which one or more techniques described herein may be implemented according to various embodiments.

FIG. 3 illustrates an example of a data center 300 that may generally be representative of one in/for which one or more techniques described herein may be implemented according to various embodiments. In the particular non-limiting example depicted in FIG. 3, data center 300 comprises racks 302-1 to 302-32. In various embodiments, the racks of data center 300 may be arranged in such fashion as to define and/or accommodate various access pathways. For example, as shown in FIG. 3, the racks of data center 300 may be arranged in such fashion as to define and/or accommodate access pathways 311A, 311B, 311C, and 311D. In some embodiments, the presence of such access pathways may generally enable automated maintenance equipment, such as robotic maintenance equipment, to physically access the computing equipment housed in the various racks of data center 300 and perform automated maintenance tasks (e.g., replace a failed sled, upgrade a sled). In various embodiments, the dimensions of access pathways 311A, 311B, 311C, and 311D, the dimensions of racks 302-1 to 302-32, and/or one or more other aspects of the physical layout of data center 300 may be selected to facilitate such automated operations. The embodiments are not limited in this context.

Figure 4:
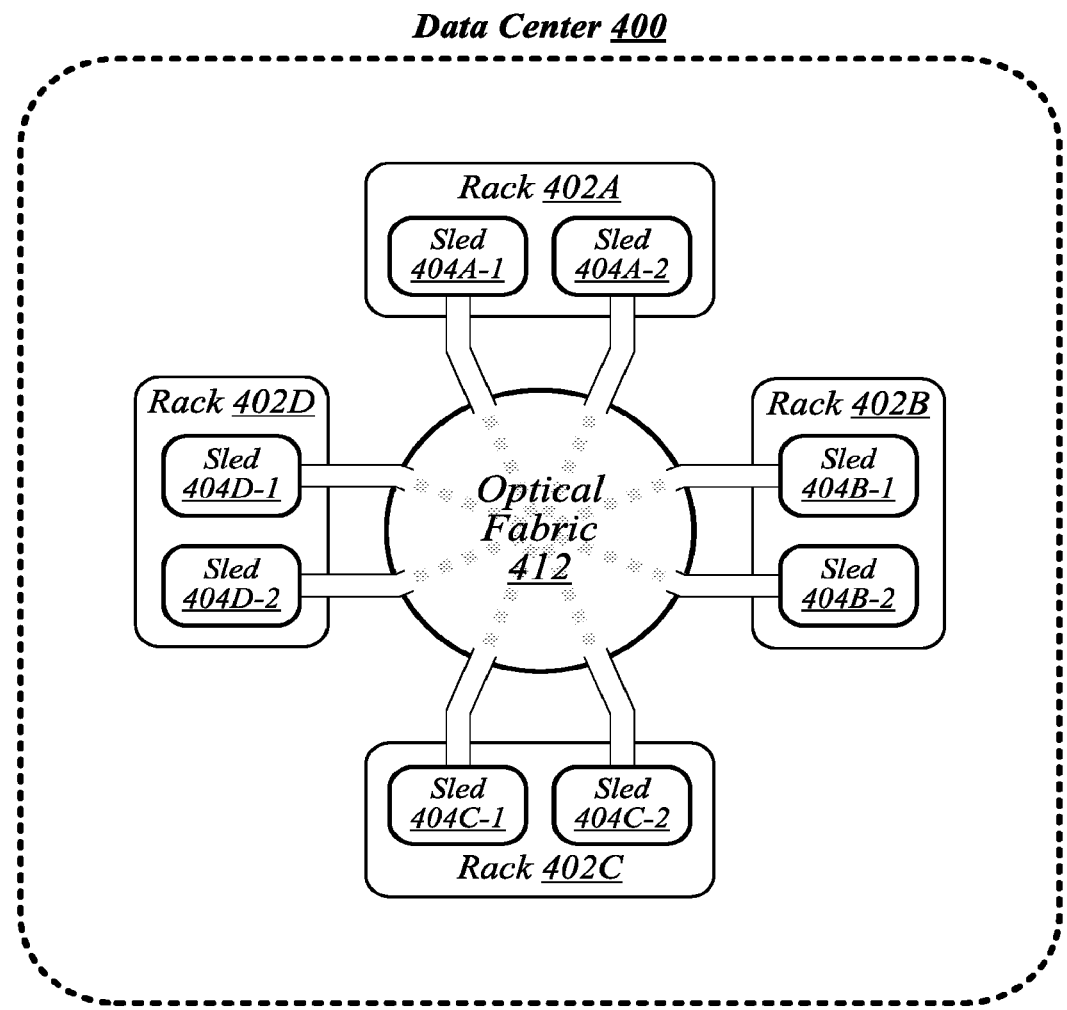
FIG. 4 is a schematic diagram of another example embodiment of a data center in which one or more techniques described herein may be implemented according to various embodiments.

FIG. 4 illustrates an example of a data center 400 that may generally be representative of one in/for which one or more techniques described herein may be implemented according to various embodiments. As shown in FIG. 4, data center 400 may feature an optical fabric 412. Optical fabric 412 may generally comprise a combination of optical signaling media (such as optical cabling) and optical switching infrastructure via which any particular sled in data center 400 can send signals to (and receive signals from) each of the other sleds in data center 400. The signaling connectivity that optical fabric 412 provides to any given sled may include connectivity both to other sleds in a same rack and sleds in other racks. In the particular non-limiting example depicted in FIG. 4, data center 400 includes four racks 402A to 402D. Racks 402A to 402D house respective pairs of sleds 404A-1 and 404A-2, 404B-1 and 404B-2, 404C-1 and 404C-2, and 404D-1 and 404D-2. Thus, in this example, data center 400 comprises a total of eight sleds. Via optical fabric 412, each such sled may possess signaling connectivity with each of the seven other sleds in data center 400. For example, via optical fabric 412, sled 404A-1 in rack 402A may possess signaling connectivity with sled 404A-2 in rack 402A, as well as the six other sleds 404B-1, 404B-2, 404C-1, 404C-2, 404D-1, and 404D-2 that are distributed among the other racks 402B, 402C, and 402D of data center 400. The embodiments are not limited to this example.

Figure 5:
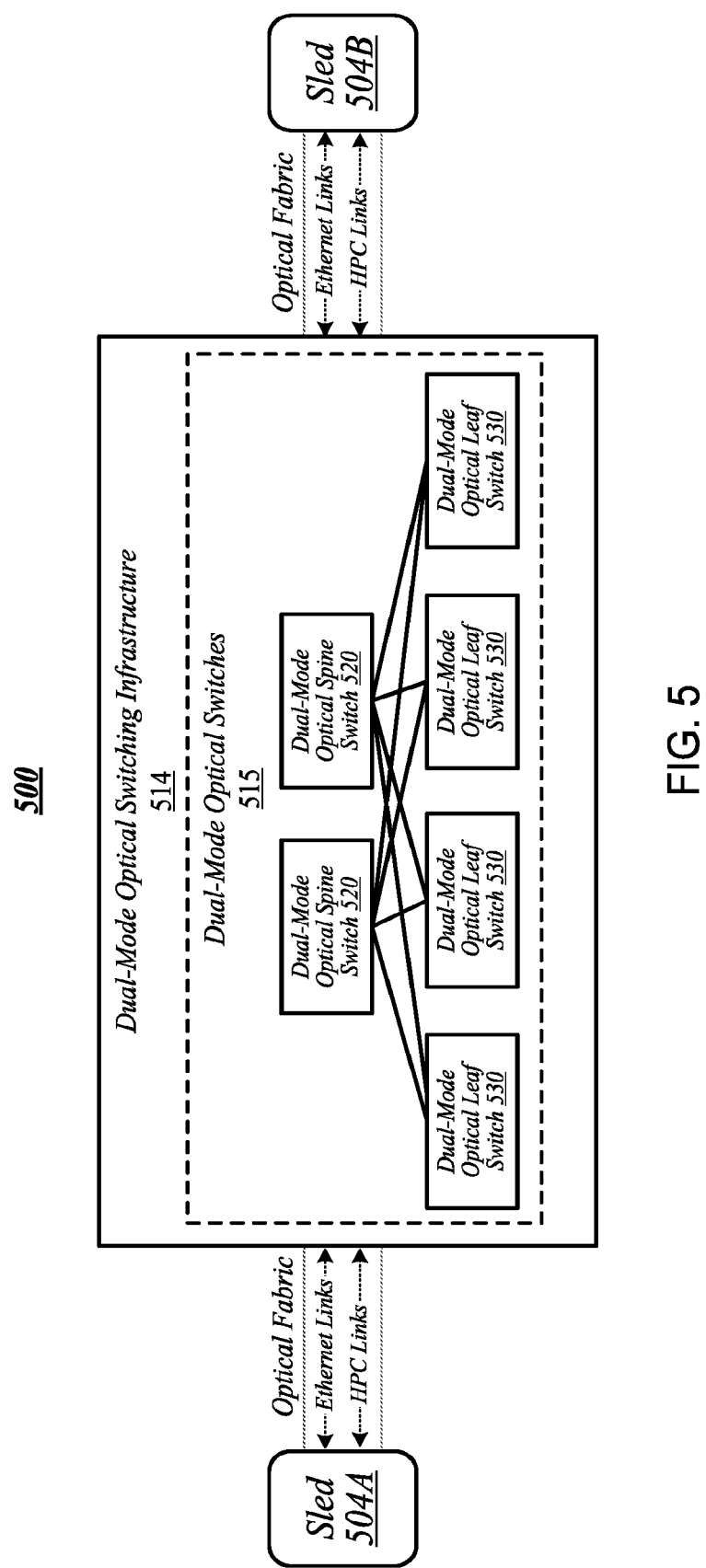
FIG. 5 is a diagram of a connectivity scheme representative of link-layer connectivity that may be established among various sleds of the data centers of FIGS. 1, 3, and 4.

FIG. 5 illustrates an overview of a connectivity scheme 500 that may generally be representative of link-layer connectivity that may be established in some embodiments among the various sleds of a data center, such as any of example data centers 100, 300, and 400 of FIGS. 1, 3, and 4. Connectivity scheme 500 may be implemented using an optical fabric that features a dual-mode optical switching infrastructure 514. Dual-mode optical switching infrastructure 514 may generally comprise a switching infrastructure that is capable of receiving communications according to multiple link-layer protocols via a same unified set of optical signaling media, and properly switching such communications. In various embodiments, dual-mode optical switching infrastructure 514 may be implemented using one or more dual-mode optical switches 515. In various embodiments, dual-mode optical switches 515 may generally comprise high-radix switches. In some embodiments, dual-mode optical switches 515 may comprise multi-ply switches, such as four-ply switches. In various embodiments, dual-mode optical switches 515 may feature integrated silicon photonics that enable them to switch communications with significantly reduced latency in comparison to conventional switching devices. In some embodiments, dual-mode optical switches 515 may constitute leaf switches 530 in a leaf-spine architecture additionally including one or more dual-mode optical spine switches 520.

In various embodiments, dual-mode optical switches may be capable of receiving both Ethernet protocol communications carrying Internet Protocol (IP packets) and communications according to a second, high-performance computing (HPC) link-layer protocol (e.g., Intel's Omni-Path Architecture's, Infiniband) via optical signaling media of an optical fabric. As reflected in FIG. 5, with respect to any particular pair of sleds 504A and 504B possessing optical signaling connectivity to the optical fabric, connectivity scheme 500 may thus provide support for link-layer connectivity via both Ethernet links and HPC links. Thus, both Ethernet and HPC communications can be supported by a single high-bandwidth, low-latency switch fabric. The embodiments are not limited to this example.

Figure 6:
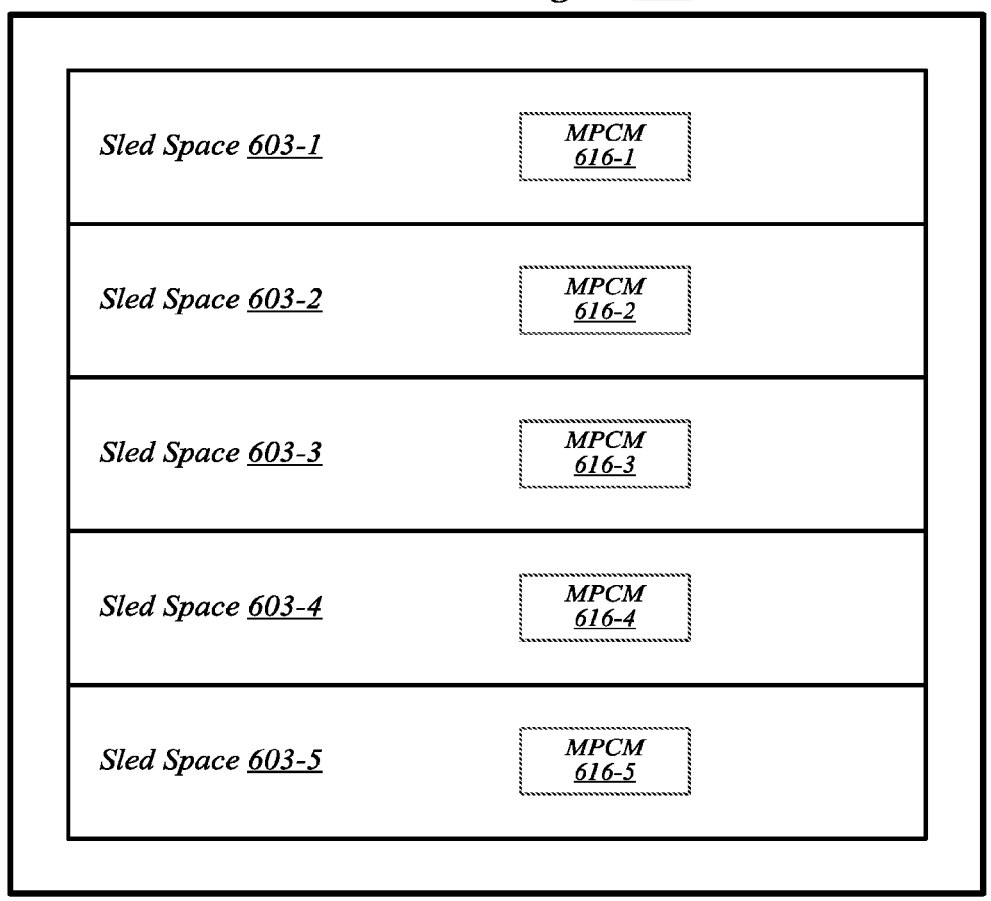
FIG. 6 is a diagram of a rack architecture that may be representative of an architecture of any particular one of the racks depicted in FIGS. 1-4 according to some embodiments.

FIG. 6 illustrates a general overview of a rack architecture 600 that may be representative of an architecture of any particular one of the racks depicted in FIGS. 1 to 4 according to some embodiments. As reflected in FIG. 6, rack architecture 600 may generally feature a plurality of sled spaces into which sleds may be inserted, each of which may be robotically-accessible via a rack access region 601. In the particular non-limiting example depicted in FIG. 6, rack architecture 600 features five sled spaces 603-1 to 603-5. Sled spaces 603-1 to 603-5 feature respective multi-purpose connector modules (MPCMs) 616-1 to 616-5.

Figure 7:
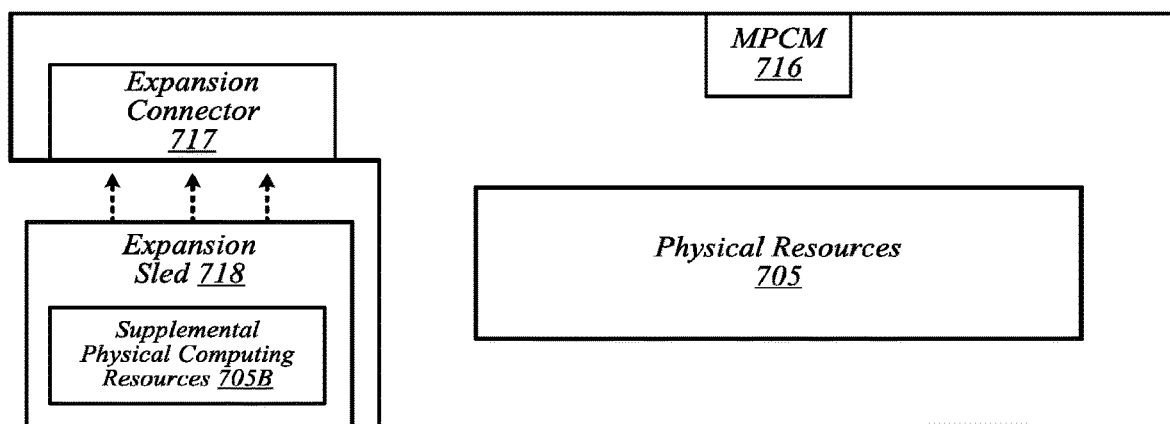
FIG. 7 is a diagram of an example embodiment of a sled that may be used with the rack architecture of FIG. 6.

FIG. 7 illustrates an example of a sled 704 that may be representative of a sled of such a type. As shown in FIG. 7, sled 704 may comprise a set of physical resources 705, as well as an MPCM 716 designed to couple with a counterpart MPCM when sled 704 is inserted into a sled space such as any of sled spaces 603-1 to 603-5 of FIG. 6. Sled 704 may also feature an expansion connector 717. Expansion connector 717 may generally comprise a socket, slot, or other type of connection element that is capable of accepting one or more types of expansion modules, such as an expansion sled 718. By coupling with a counterpart connector on expansion sled 718, expansion connector 717 may provide physical resources 705 with access to supplemental computing resources 705B residing on expansion sled 718. The embodiments are not limited in this context.

Figure 8:
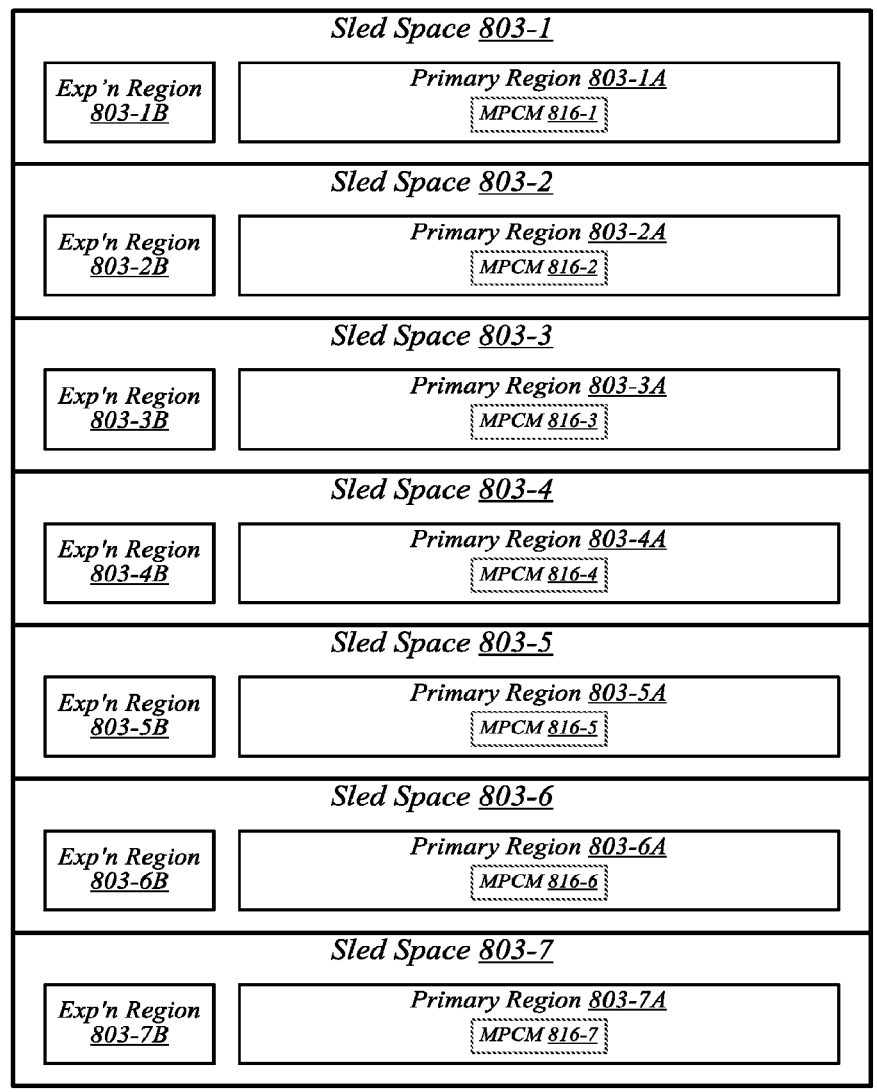
FIG. 8 is a diagram of an example embodiment of a rack architecture to provide support for sleds featuring expansion capabilities.

FIG. 8 illustrates an example of a rack architecture 800 that may be representative of a rack architecture that may be implemented in order to provide support for sleds featuring expansion capabilities, such as sled 704 of FIG. 7. In the particular non-limiting example depicted in FIG. 8, rack architecture 800 includes seven sled spaces 803-1 to 803-7, which feature respective MPCMs 816-1 to 816-7. Sled spaces 803-1 to 803-7 include respective primary regions 803-1A to 803-7A and respective expansion regions 803-1B to 803-7B. With respect to each such sled space, when the corresponding MPCM is coupled with a counterpart MPCM of an inserted sled, the primary region may generally constitute a region of the sled space that physically accommodates the inserted sled. The expansion region may generally constitute a region of the sled space that can physically accommodate an expansion module, such as expansion sled 718 of FIG. 7, in the event that the inserted sled is configured with such a module.

Figure 9:
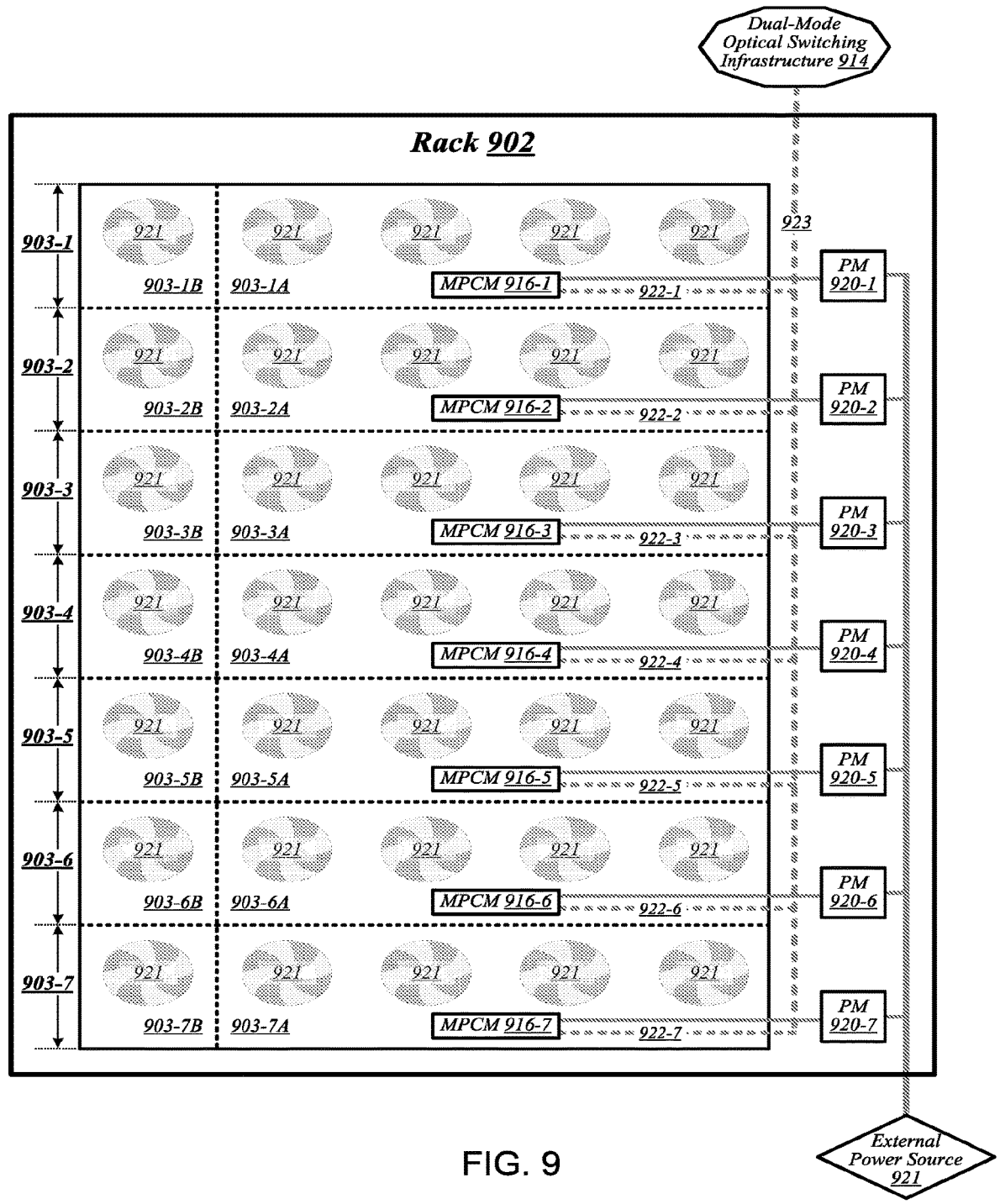
FIG. 9 is a diagram of an example embodiment of a rack implemented according to the rack architecture of FIG. 8.

FIG. 9 illustrates an example of a rack 902 that may be representative of a rack implemented according to rack architecture 800 of FIG. 8 according to some embodiments. In the particular non-limiting example depicted in FIG. 9, rack 902 features seven sled spaces 903-1 to 903-7, which include respective primary regions 903-1A to 903-7A and respective expansion regions 903-1B to 903-7B. In various embodiments, temperature control in rack 902 may be implemented using an air cooling system. For example, as reflected in FIG. 9, rack 902 may feature a plurality of fans 919 that are generally arranged to provide air cooling within the various sled spaces 903-1 to 903-7. In some embodiments, the height of the sled space is greater than the conventional "1U" server height. In such embodiments, fans 919 may generally comprise relatively slow, large diameter cooling fans as compared to fans used in conventional rack configurations. Running larger diameter cooling fans at lower speeds may increase fan lifetime relative to smaller diameter cooling fans running at higher speeds while still providing the same amount of cooling. The sleds are physically shallower than conventional rack dimensions. Further, components are arranged on each sled to reduce thermal shadowing (i.e., not arranged serially in the direction of air flow). As a result, the wider, shallower sleds allow for an increase in device performance because the devices can be operated at a higher thermal envelope (e.g., 250 W) due to improved cooling (i.e., no thermal shadowing, more space between devices, more room for larger heat sinks, etc.).

MPCMs 916-1 to 916-7 may be configured to provide inserted sleds with access to power sourced by respective power modules 920-1 to 920-7, each of which may draw power from an external power source 921. In various embodiments, external power source 921 may deliver alternating current (AC) power to rack 902, and power modules 920-1 to 920-7 may be configured to convert such AC power to direct current (DC) power to be sourced to inserted sleds. In some embodiments, for example, power modules 920-1 to 920-7 may be configured to convert 277-volt AC power into 12-volt DC power for provision to inserted sleds via respective MPCMs 916-1 to 916-7. The embodiments are not limited to this example.

MPCMs 916-1 to 916-7 may also be arranged to provide inserted sleds with optical signaling connectivity to a dual-mode optical switching infrastructure 914, which may be the same as—or similar to—dual-mode optical switching infrastructure 514 of FIG. 5. In various embodiments, optical connectors contained in MPCMs 916-1 to 916-7 may be designed to couple with counterpart optical connectors contained in MPCMs of inserted sleds to provide such sleds with optical signaling connectivity to dual-mode optical switching infrastructure 914 via respective lengths of optical cabling 922-1 to 922-7. In some embodiments, each such length of optical cabling may extend from its corresponding MPCM to an optical interconnect loom 923 that is external to the sled spaces of rack 902. In various embodiments, optical interconnect loom 923 may be arranged to pass through a support post or other type of load-bearing element of rack 902. The embodiments are not limited in this context. Because inserted sleds connect to an optical switching infrastructure via MPCMs, the resources typically spent in manually configuring the rack cabling to accommodate a newly inserted sled can be saved.

Figure 10:
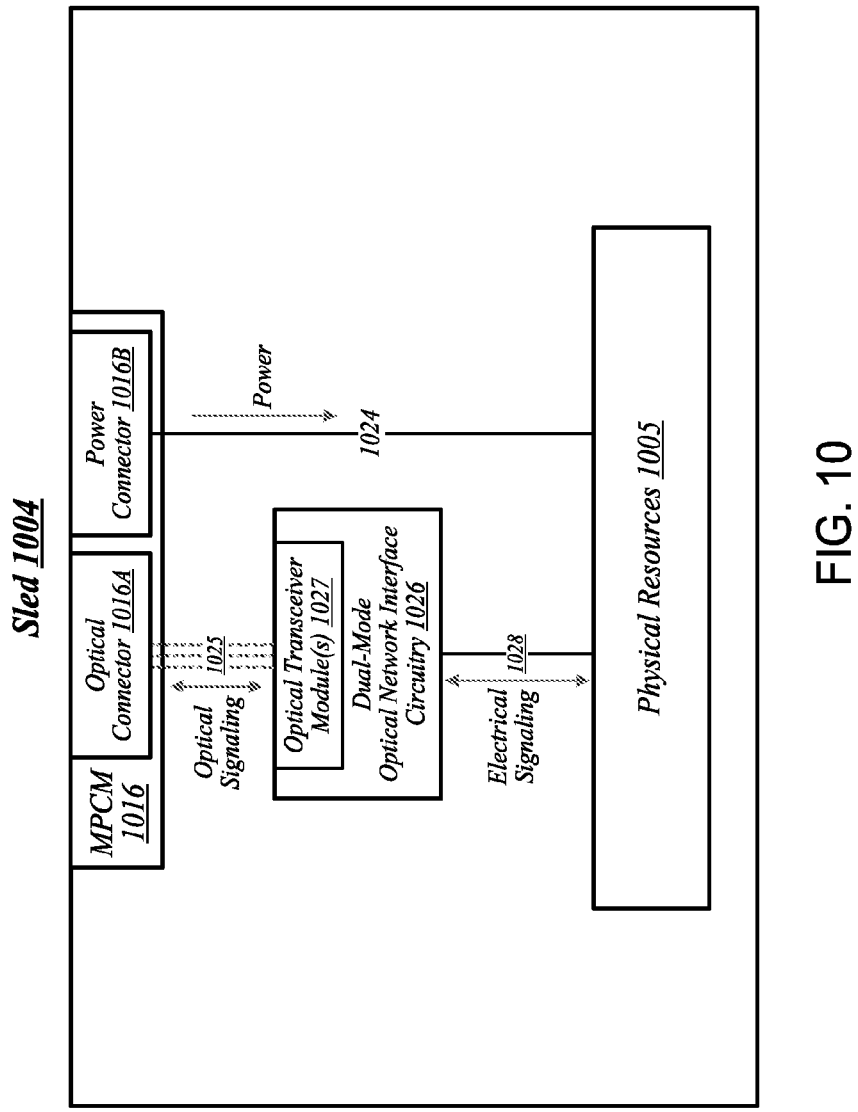
FIG. 10 is a diagram of an example embodiment of a sled designed for use in conjunction with the rack of FIG. 9.

FIG. 10 illustrates an example of a sled 1004 that may be representative of a sled designed for use in conjunction with rack 902 of FIG. 9 according to some embodiments. Sled 1004 may feature an MPCM 1016 that comprises an optical connector 1016A and a power connector 1016B, and that is designed to couple with a counterpart MPCM of a sled space in conjunction with insertion of MPCM 1016 into that sled space. Coupling MPCM 1016 with such a counterpart MPCM may cause power connector 1016 to couple with a power connector comprised in the counterpart MPCM. This may generally enable physical resources 1005 of sled 1004 to source power from an external source, via power connector 1016 and power transmission media 1024 that conductively couples power connector 1016 to physical resources 1005.

Sled 1004 may also include dual-mode optical network interface circuitry 1026. Dual-mode optical network interface circuitry 1026 may generally comprise circuitry that is capable of communicating over optical signaling media according to each of multiple link-layer protocols supported by dual-mode optical switching infrastructure 914 of FIG. 9. In some embodiments, dual-mode optical network interface circuitry 1026 may be capable both of Ethernet protocol communications and of communications according to a second, high-performance protocol. In various embodiments, dual-mode optical network interface circuitry 1026 may include one or more optical transceiver modules 1027, each of which may be capable of transmitting and receiving optical signals over each of one or more optical channels. The embodiments are not limited in this context.

Coupling MPCM 1016 with a counterpart MPCM of a sled space in a given rack may cause optical connector 1016A to couple with an optical connector comprised in the counterpart MPCM. This may generally establish optical connectivity between optical cabling of the sled and dual-mode optical network interface circuitry 1026, via each of a set of optical channels 1025. Dual-mode optical network interface circuitry 1026 may communicate with the physical resources 1005 of sled 1004 via electrical signaling media 1028. In addition to the dimensions of the sleds and arrangement of components on the sleds to provide improved cooling and enable operation at a relatively higher thermal envelope (e.g., 250 W), as described above with reference to FIG. 9, in some embodiments, a sled may include one or more additional features to facilitate air cooling, such as a heat pipe and/or heat sinks arranged to dissipate heat generated by physical resources 1005. It is worthy of note that although the example sled 1004 depicted in FIG. 10 does not feature an expansion connector, any given sled that features the design elements of sled 1004 may also feature an expansion connector according to some embodiments. The embodiments are not limited in this context.

Figure 11:
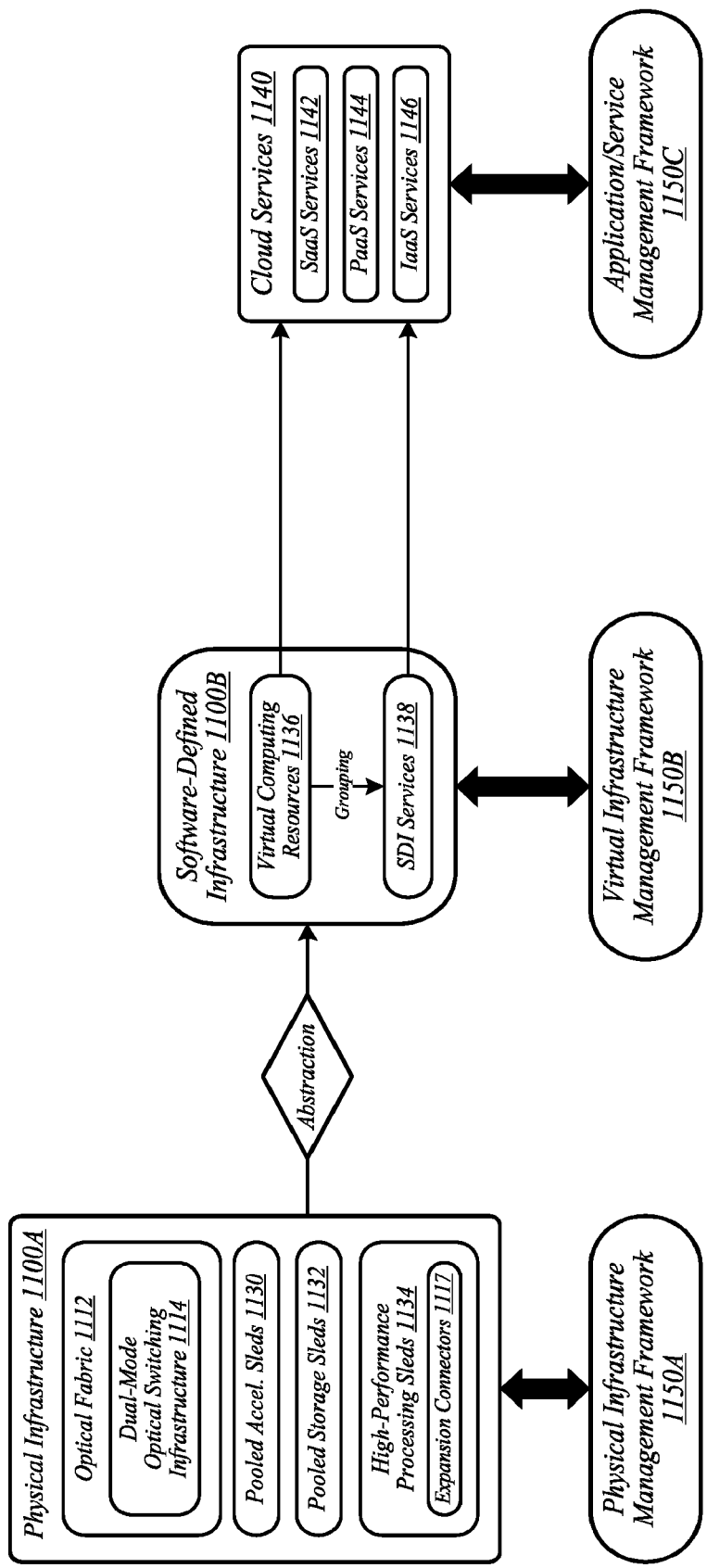
FIG. 11 is a diagram of an example embodiment of a data center in which one or more techniques described herein may be implemented according to various embodiments.

FIG. 11 illustrates an example of a data center 1100 that may generally be representative of one in/for which one or more techniques described herein may be implemented according to various embodiments. As reflected in FIG. 11, a physical infrastructure management framework 1150A may be implemented to facilitate management of a physical infrastructure 1100A of data center 1100. In various embodiments, one function of physical infrastructure management framework 1150A may be to manage automated maintenance functions within data center 1100, such as the use of robotic maintenance equipment to service computing equipment within physical infrastructure 1100A. In some embodiments, physical infrastructure 1100A may feature an advanced telemetry system that performs telemetry reporting that is sufficiently robust to support remote automated management of physical infrastructure 1100A. In various embodiments, telemetry information provided by such an advanced telemetry system may support features such as failure prediction/prevention capabilities and capacity planning capabilities. In some embodiments, physical infrastructure management framework 1150A may also be configured to manage authentication of physical infrastructure components using hardware attestation techniques. For example, robots may verify the authenticity of components before installation by analyzing information collected from a radio frequency identification (RFID) tag associated with each component to be installed. The embodiments are not limited in this context.

As shown in FIG. 11, the physical infrastructure 1100A of data center 1100 may comprise an optical fabric 1112, which may include a dual-mode optical switching infrastructure 1114. Optical fabric 1112 and dual-mode optical switching infrastructure 1114 may be the same as—or similar to—optical fabric 412 of FIG. 4 and dual-mode optical switching infrastructure 514 of FIG. 5, respectively, and may provide high-bandwidth, low-latency, multi-protocol connectivity among sleds of data center 1100. As discussed above, with reference to FIG. 1, in various embodiments, the availability of such connectivity may make it feasible to disaggregate and dynamically pool resources such as accelerators, memory, and storage. In some embodiments, for example, one or more pooled accelerator sleds 1130 may be included among the physical infrastructure 1100A of data center 1100, each of which may comprise a pool of accelerator resources—such as co-processors and/or FPGAs, for example—that is globally accessible to other sleds via optical fabric 1112 and dual-mode optical switching infrastructure 1114.

In another example, in various embodiments, one or more pooled storage sleds 1132 may be included among the physical infrastructure 1100A of data center 1100, each of which may comprise a pool of storage resources that is available globally accessible to other sleds via optical fabric 1112 and dual-mode optical switching infrastructure 1114. In some embodiments, such pooled storage sleds 1132 may comprise pools of solid-state storage devices such as solid-state drives (SSDs). In various embodiments, one or more high-performance processing sleds 1134 may be included among the physical infrastructure 1100A of data center 1100. In some embodiments, high-performance processing sleds 1134 may comprise pools of high-performance processors, as well as cooling features that enhance air cooling to yield a higher thermal envelope of up to 250 W or more. In various embodiments, any given high-performance processing sled 1134 may feature an expansion connector 1117 that can accept a far memory expansion sled, such that the far memory that is locally available to that high-performance processing sled 1134 is disaggregated from the processors and near memory comprised on that sled. In some embodiments, such a high-performance processing sled 1134 may be configured with far memory using an expansion sled that comprises low-latency SSD storage. The optical infrastructure allows for compute resources on one sled to utilize remote accelerator/FPGA, memory, and/or SSD resources that are disaggregated on a sled located on the same rack or any other rack in the data center. The remote resources can be located one switch jump away or two-switch jumps away in the spine-leaf network architecture described above with reference to FIG. 5. The embodiments are not limited in this context.

In various embodiments, one or more layers of abstraction may be applied to the physical resources of physical infrastructure 1100A in order to define a virtual infrastructure, such as a software-defined infrastructure 1100B. In some embodiments, virtual computing resources 1136 of software-defined infrastructure 1100B may be allocated to support the provision of cloud services 1140. In various embodiments, particular sets of virtual computing resources 1136 may be grouped for provision to cloud services 1140 in the form of SDI services 1138. Examples of cloud services 1140 may include—without limitation—software as a service (SaaS) services 1142, platform as a service (PaaS) services 1144, and infrastructure as a service (IaaS) services 1146.

In some embodiments, management of software-defined infrastructure 1100B may be conducted using a virtual infrastructure management framework 1150B. In various embodiments, virtual infrastructure management framework 1150B may be designed to implement workload fingerprinting techniques and/or machine-learning techniques in conjunction with managing allocation of virtual computing resources 1136 and/or SDI services 1138 to cloud services 1140. In some embodiments, virtual infrastructure management framework 1150B may use/consult telemetry data in conjunction with performing such resource allocation. In various embodiments, an application/service management framework 1150C may be implemented in order to provide quality of service (QoS) management capabilities for cloud services 1140. The embodiments are not limited in this context.

Figure 12:
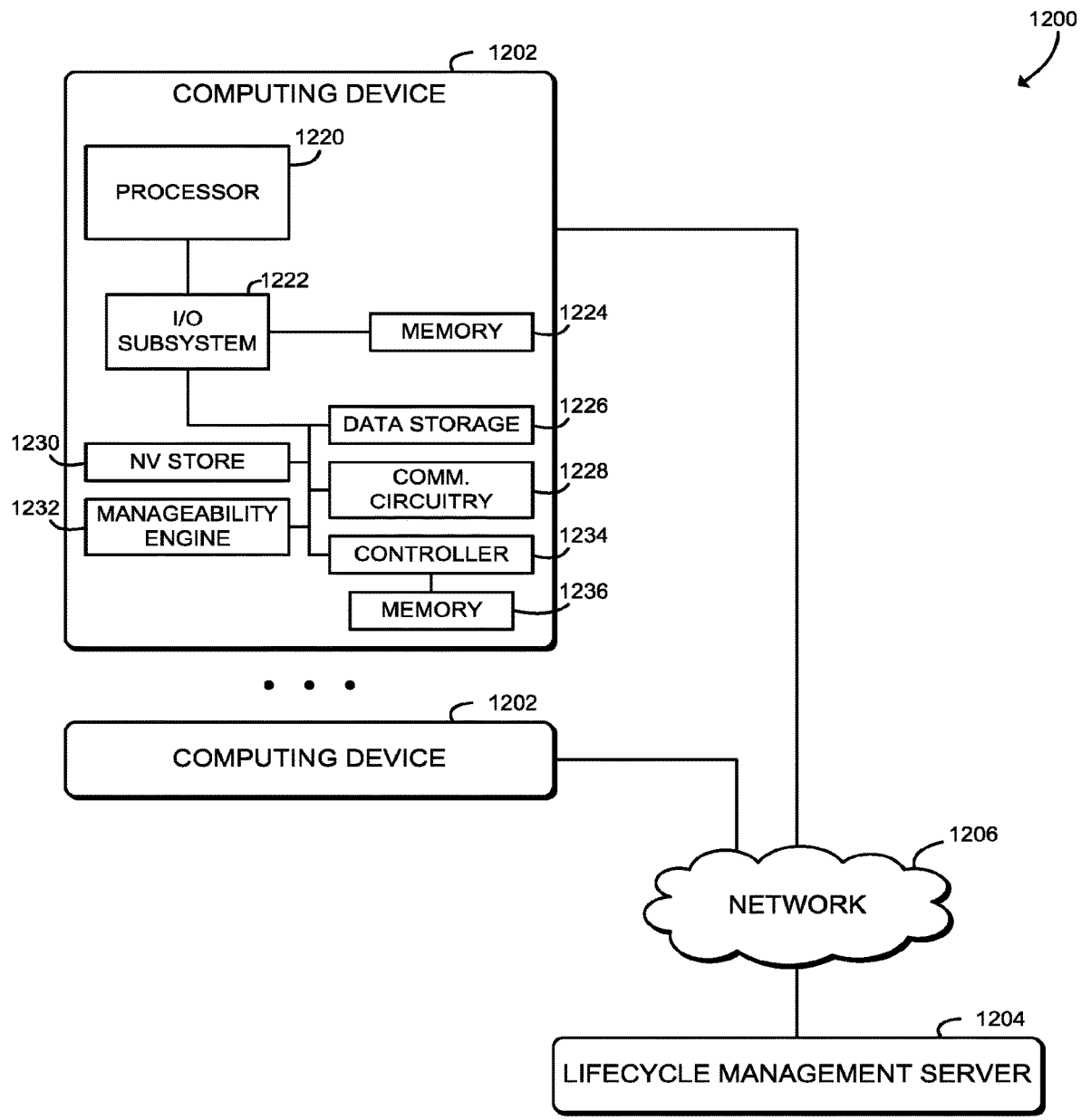
FIG. 12 is a simplified block diagram of at least one embodiment of a system for lifecycle management.

Referring now to FIG. 12, an illustrative system 1200 for lifecycle management includes one or more computing devices 1202 and a lifecycle management server 1204 in communication over a network 1206. As described further below, each of the computing devices 1202 includes multiple controllers 1234 that are each coupled to controller memory 1236. Each computing device 1202 may be embodied as server computer, a rack server, a blade server, a compute node, and/or a sled in a data center, such as a sled 204 as described above in connection with FIG. 2, a sled of the physical infrastructure 1100A as described above in connection with FIG. 11, or another sled of the data center.

In use, as described below, a computing device 1202 boots into a lightweight firmware boot environment. The lightweight firmware boot environment opens a network connection to the lifecycle management server 1204 and then downloads firmware images for one or more controllers 1234. The lightweight firmware boot environment installs the firmware images into the controller memory 1236 of each the corresponding controller 1234. The computing device 1202 continues to boot, and in use the controllers 1234 access the firmware images in the corresponding controller memory 1236. By including firmware images in a high-performance controller memory 1236 such as DRAM or 3D XPoint™ memory, the computing device 1202 may improve performance compared to devices that store controller firmware in flash memory. Additionally, the system 1200 centralizes management of firmware images in the lifecycle management server 1204, which may improve management efficiency, especially for data centers and other enterprises with large numbers of computing devices 1202.

As shown in FIG. 12, each computing device 1202 illustratively includes a processor 1220, an input/output subsystem 1222, a memory 1224, a data storage device 1226, a communication subsystem 1228, and/or other components and devices commonly found in a sled 204, 404, 504, 704, 1004, 1100A, a storage sled 204-1, an accelerator sled 204-2, a memory sled 204-3, a compute sled 204-4, and/or a similar server computing device. Of course, the computing device 1202 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 1224, or portions thereof, may be incorporated in the processor 1220 in some embodiments.

The processor 1220 may be embodied as any type of processor capable of performing the functions described herein. For example, the processor 1220 may be embodied as a single or multi-core processor(s), digital signal processor, microcontroller, or other processor or processing/controlling circuit. Similarly, the memory 1224 may be embodied as any type of volatile or non-volatile memory or data storage capable of performing the functions described herein. In operation, the memory 1224 may store various data and software used during operation of the computing device 1202 such operating systems, applications, programs, libraries, and drivers. The memory 1224 is communicatively coupled to the processor 1220 via the I/O subsystem 1222, which may be embodied as circuitry and/or components to facilitate input/output operations with the processor 1220, the memory 1224, and other components of the computing device 1202. For example, the I/O subsystem 1222 may be embodied as, or otherwise include, memory controller hubs, input/output control hubs, sensor hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 1222 may form a portion of a system-on-a-chip (SoC) and be incorporated, along with the processor 1220, the memory 1224, and other components of the computing device 1202, on a single integrated circuit chip.

The data storage device 1226 may be embodied as any type of device or devices configured for short-term or long-term storage of data such as, for example, memory devices and circuits, memory cards, hard disk drives, solid-state drives, non-volatile flash memory, or other data storage devices. The computing device 1202 may also include a communications subsystem 1228, which may be embodied as any communication circuit, device, or collection thereof, capable of enabling communications between the computing device 1202 and other remote devices over a computer network (not shown). The communications subsystem 1228 may be configured to use any one or more communication technology (e.g., wired or wireless communications) and associated protocols (e.g., Ethernet, InfiniBand®, Bluetooth®, Wi-Fi®, WiMAX, 3G, 4G LTE, etc.) to effect such communication.

As shown, the computing device 1202 may further include a nonvolatile store 1230, and a manageability controller 1232. The nonvolatile store 1230 may be embodied as a flash memory device or other nonvolatile storage, and may be accessible to the computing device 1202 early in a boot process. As described further below, the nonvolatile store 1230 may include a lightweight firmware boot environment that is loaded during boot of the computing device 1202.

The manageability controller 1232 may be embodied as any hardware component(s) or circuitry capable of providing manageability and security-related services to the computing device 1202. In particular, the manageability controller 1232 may include a microprocessor, microcontroller, or other embedded controller capable of executing firmware and/or other code independently and securely from the processor 1220. For example, the manageability controller 1232 may be embodied as a manageability engine (ME), a converged security and manageability engine (CSME), an Intel® innovation engine (IE), a board management controller (BMC), an embedded controller (EC), or other independent controller of the computing device 1202.

As shown, the computing device 1202 may also include one or more additional controllers 1234, which each may be embodied as any microprocessor, microcontroller, or other embedded controller capable of executing firmware. As shown, each controller 1234 is coupled to a controller memory 1236, which may be embodied as any type of volatile or non-volatile memory or data storage capable of performing the functions described herein. For example, the controller memory 1236 may be embodied as dynamic random access memory (DRAM), 3D XPoint memory, or other high-performance memory device. Additionally, although shown as a separate component, it should be understood that other components of the computing device 1202 may include one or more controllers 1234 and associated controller memory 1236. For example, a solid state drive (SSD) controller, a network interface controller (NIC), a board management controller (BMC), a manageability controller, a field-programmable gate array (FPGA), or other controller of the computing device 1202 may be embodied as a controller 1234 that is coupled to controller memory 1236. Additionally, although illustrated as including a dedicated controller memory 1236 for each controller 1234, in some embodiments, the controllers 1234 may access a shared memory device, such as the main memory 1224.

The lifecycle management server 1204 may be embodied as any type of computation or computer device capable of performing the functions described herein, including, without limitation, a computer, a compute sled, a multiprocessor system, a server, a rack-mounted server, a blade server, a network appliance, a distributed computing system, a processor-based system, and/or a consumer electronic device. As such, the lifecycle management server 1204 may be embodied as a single server computing device or a collection of servers and associated devices. For example, in some embodiments, the lifecycle management server 1204 may be embodied as a "virtual server" formed from multiple computing devices distributed across the network 1206 and operating in a public or private cloud. Accordingly, although the lifecycle management server 1204 is illustrated in FIG. 1 and described below as embodied as a single server computing device, it should be appreciated that the lifecycle management server 1204 may be embodied as multiple devices cooperating together to facilitate the functionality described below. The lifecycle management server 1204 may include a processor, an I/O subsystem, a memory, a data storage device, a communication subsystem, peripheral devices, and/or other components and devices commonly found in a compute sled or similar computing device. Those individual components of the lifecycle management server 1204 may be similar to the corresponding components of the computing device 1202, the description of which is applicable to the corresponding components of the lifecycle management server 1204 and is not repeated herein so as not to obscure the present disclosure.

As discussed in more detail below, the computing devices 1202 and the lifecycle management server 1204 may be configured to transmit and receive data with each other and/or other devices of the system 1200 over the network 1206. The network 1206 may be embodied as any number of various wired and/or wireless networks. For example, the network 1206 may be embodied as, or otherwise include, a wired or wireless local area network (LAN), and/or a wired or wireless wide area network (WAN). As such, the network 1206 may include any number of additional devices, such as additional computers, routers, and switches, to facilitate communications among the devices of the system 1200.

Figure 13:
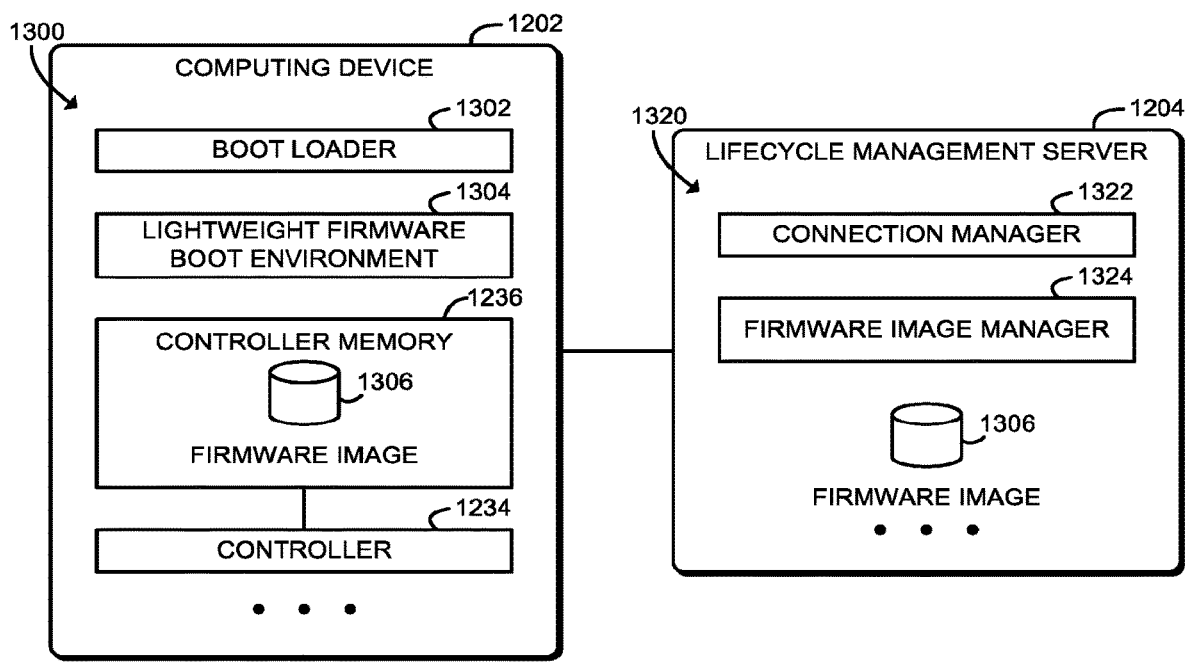
FIG. 13 is a simplified block diagram of at least one embodiment of various environments that may be established by the system of FIG. 12.

Referring now to FIG. 13, in an illustrative embodiment, the computing device 1202 establishes an environment 1300 during operation. The illustrative environment 1300 includes a bootloader 1302 and a lightweight firmware boot environment 1304. The various components of the environment 1300 may be embodied as hardware, firmware, software, or a combination thereof. As such, in some embodiments, one or more of the components of the environment 1300 may be embodied as circuitry or collection of electrical devices (e.g., bootloader circuitry 1302 and/or lightweight firmware boot environment circuitry 1304). It should be appreciated that, in such embodiments, one or more of the bootloader circuitry 1302 and/or the lightweight firmware boot environment circuitry 1304 may form a portion of the processor 1220, the I/O subsystem 1222, a controller 1234, and/or other components of the computing device 1202. Additionally, in some embodiments, one or more of the illustrative components may form a portion of another component and/or one or more of the illustrative components may be independent of one another.

The bootloader 1302 is configured to load the lightweight firmware boot environment 1304 in response to starting the boot process of the computing device 1202. The lightweight firmware boot environment 1304 may be loaded from a flash memory device such as the nonvolatile store 1230. The boot process may be started in response to a power cycle or other reset of the computing device 1202. The bootloader 1302 is further configured to continue the boot process after installation of one or more firmware images 1306, as described further below.

The lightweight firmware boot environment 1304 is configured to connect to the lifecycle management server 1204 via a network connection after being loaded. The lightweight firmware boot environment 1304 is configured to download one or more firmware images 1306 from the lifecycle management server 1204 via the network connection, and to install each firmware image 1306 to a corresponding controller memory 1236. In some embodiments, the lightweight firmware boot environment 1304 may be further configured to download configuration data such as firmware variables from the lifecycle management server 1204 via the network connection, and install the configuration data.

Each controller 1234 is configured to access a firmware image 1306 in the corresponding controller memory 1236 in response to the firmware image 1306 being installed. Each firmware image 1306 may be embodied as binary data that is executed or otherwise used by the controller 1234 during operation of the computing device 1202. For example, the firmware image 1306 may be embodied as binary code or data accessed by an SSD controller, a NIC, a BMC or other manageability controller. Additionally or alternatively, in some embodiments the firmware image 1306 may be embodied as manufacturer-provided bitstream for a field-programmable gate array (FPGA). In some embodiments, the firmware image 1306 may be embodied as one or more platform firmware images executable by the processor 1220 (e.g., one or more UEFI firmware drivers or applications, a BIOS image, or other platform firmware).

Still referring to FIG. 13, the lifecycle management server 1204 establishes an environment 1320 during operation. The illustrative environment 1320 includes a connection manager 1322 and an image manager 1324. The various components of the environment 1320 may be embodied as hardware, firmware, software, or a combination thereof. As such, in some embodiments, one or more of the components of the environment 1320 may be embodied as circuitry or collection of electrical devices (e.g., connection manager circuitry 1322 and/or image manager circuitry 1324). It should be appreciated that, in such embodiments, one or more of the connection manager circuitry 1322 and/or the image manager circuitry 1324 may form a portion of the processor, the I/O subsystem, and/or other components of the lifecycle management server 1204. Additionally, in some embodiments, one or more of the illustrative components may form a portion of another component and/or one or more of the illustrative components may be independent of one another.

The connection manager 1322 is configured to receive connection requests from the computing devices 1202. The connection manager 1322 is further configured to transmit one or more firmware images 1306 to a computing device 1202 in response to the connection request. In some embodiments, the connection manager 1322 may be further configured to transmit configuration data to the computing device 1202, such as one or more firmware variables.

The image manager 1324 is configured to identify a firmware image 1306 for a controller 1234 of a computing device 1202 in response receiving a connection request from the computing device 1202. Identifying the firmware image 1306 may include selecting the firmware image 1306 and/or a version of the firmware image 1306 from multiple firmware images 1306 based on an identity of the controller 1234. In some embodiments, identifying the firmware image 1306 may include selecting a version of the firmware image 1306 based on an identity of the computing device 1202. In some embodiments, the image manager 1324 may be further configured to identify configuration data such as firmware variables for the computing device 1202.

Figure 14:
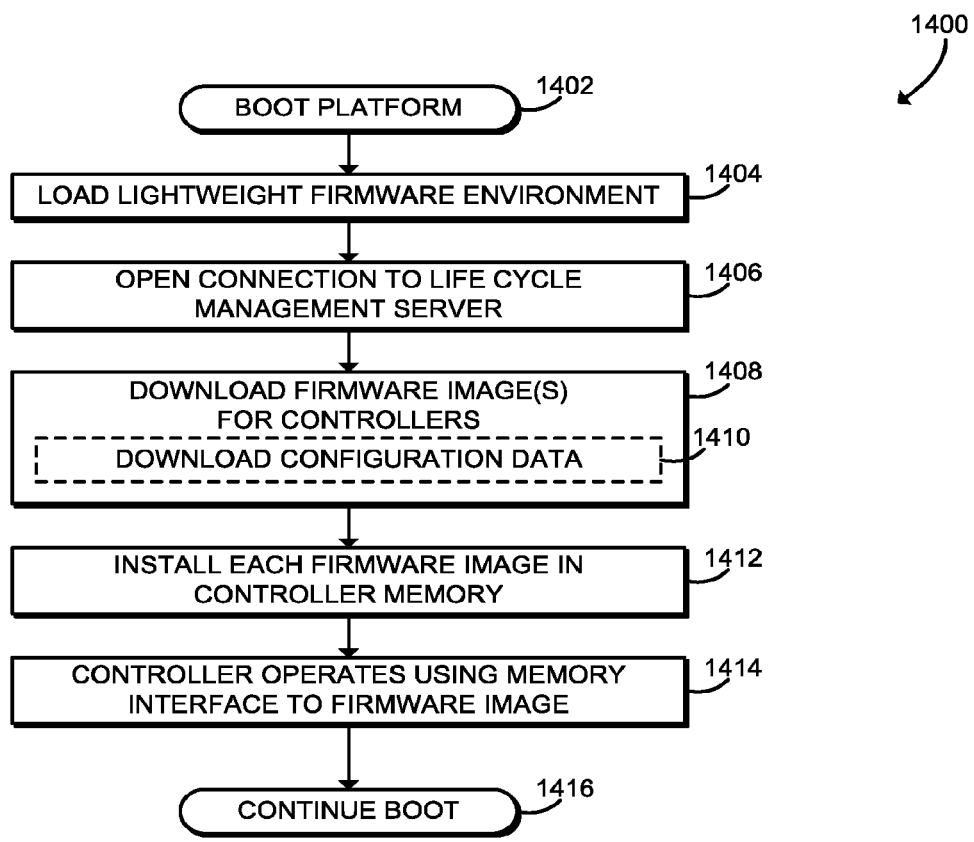
FIG. 14 is a simplified flow diagram of at least one embodiment of a method for lifecycle management that may be executed by a computing device of FIGS. 12-13.

Referring now to FIG. 14, in use, the computing device 1202 may execute a method 1400 for lifecycle management. It should be appreciated that, in some embodiments, the operations of the method 1400 may be performed by one or more components of the environment 1300 of the computing device 1202 as shown in FIG. 13. The method 1400 begins in block 1402, in which the computing device 1202 starts a boot process. The boot process may be started, for example, in response to a reboot, power cycle, or other reset of the computing device 1202.

In block 1404, the computing device 1202 loads the lightweight firmware boot environment 1304. The lightweight firmware boot environment 1304 may be embodied as any appropriate firmware environment, such as BIOS, UEFI firmware, pre-UEFI firmware, or other firmware environment. The lightweight firmware boot environment 1304 may be loaded from the nonvolatile store 1230 or other non-volatile data storage of the computing device 1202. In some embodiments, lightweight firmware boot environment 1304 may be embodied as a limited firmware environment that loads quickly. For example, the lightweight firmware boot environment 1304 may load a minimal collection of drivers, protocols, services, or other code required to perform the function described herein.

In block 1406, the computing device 1202 opens a network connection to the lifecycle management server 1204. The computing device 1202 may use any appropriate network protocol or other technique to connect with the lifecycle management server 1204.

In block 1408, the computing device 1202 downloads one or more firmware images 1306 from the lifecycle management server 1204. The computing device 1202 may download a firmware image 1306 for each controller 1234 of the computing device 1202 that requires a firmware image 1306 to operate. In some embodiments, the computing device 1202 may provide the lifecycle management server 1204 with information such as a type, manufacturer, or other identity information for each controller 1234. As described further below, the lifecycle management server 1204 may use the identity information of the controller 1234 and/or the computing device 1202 to select the firmware images 1306 for transmission to the computing device 1202. In some embodiments, in block 1410 the computing device 1202 may download configuration data from the lifecycle management server 1204. The configuration data may be embodied as firmware variables (e.g., UEFI variables) or other configuration data used by a controller 1234 or other component of the computing device 1202.

In block 1412, the computing device 1202 installs each firmware image 1306 into the controller memory 1236 that is coupled to the corresponding controller 1234. For example, the computing device 1202 may write a firmware image 1306 to a DRAM device, 3D)(Point device, or other memory device coupled to the controller 1234. Additionally or alternatively, although illustrated as including a separate memory device coupled to each controller 1234, in some embodiments the firmware image 1306 may be written to a memory device shared by multiple controllers 1234, such as the main memory 1224. As another example, in embodiments in which the firmware image 1306 is a bitstream for an FPGA, the computing device 1202 may program the FPGA with the firmware image 1306. In some embodiments, the computing device 1202 may also install or otherwise use configuration data such as firmware variables received from the lifecycle management server 1204.

In block 1414, each controller 1234 of the computing device 1202 operates using a memory interface to the associated firmware image 1306. The controller may read, write, execute, or otherwise access the firmware image 1306 stored in the controller memory 1236. In some embodiments, the controller may verify the associated firmware image 1306 before use, for example by verifying one or more certificates, digital signatures, or otherwise verifying the authenticity of the firmware image 1306. After each controller 1234 is able to access a corresponding firmware image 1306, the method 1400 advances to block 1416, in which the computing device 1202 continues the boot process. The computing device 1202 may, for example, load and execute additional boot loaders (e.g., later-stage boot loaders), full firmware environments (e.g., a UEFI driver execution environment or other pre-boot firmware environment), boot options, operating systems, or other components of the computing device 1202. After continuing the boot process, the method 1400 is completed and the computing device 1202 may continue to operate normally. The controllers 1234 may access the firmware images 1306 stored in the controller memories 1236 during normal operation. The method 1400 may be executed again in response to subsequent platform resets or other boot events.

Figure 15:
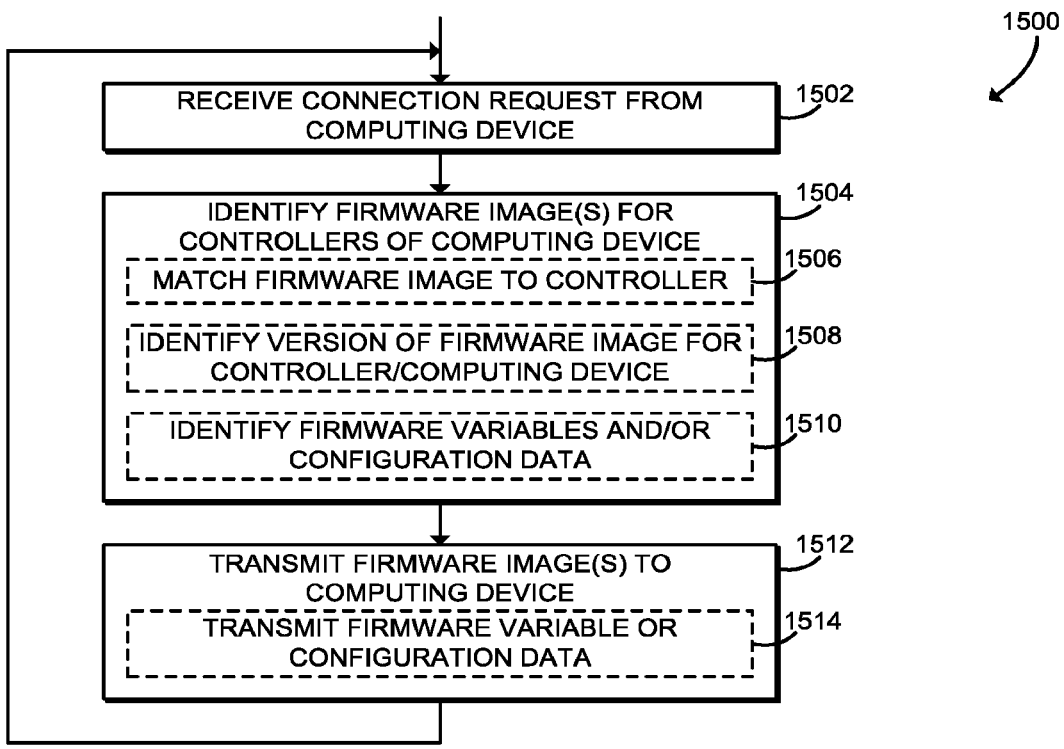
FIG. 15 is a simplified flow diagram of at least one embodiment of a method for lifecycle management that may be executed by a lifecycle management server of FIGS. 12-13.

Referring now to FIG. 15, in use, the lifecycle management server 1204 may execute a method 1500 for lifecycle management. It should be appreciated that, in some embodiments, the operations of the method 1500 may be performed by one or more components of the environment 1300 of the computing device 1202 as shown in FIG. 13. The method 1400 begins in block 1402, in which the lifecycle management server 1204 receives a connection request from a computing device 1202. As described above in connection with FIG. 14, the lightweight firmware boot environment 1304 of the computing device 1202 opens the connection to the lifecycle management server 1204 on boot. In some embodiments, the connection request may include information such as a type, manufacturer, or other identity information for one or more controllers 1234 of the computing device 1202 and/or identity information of the computing device 1202 itself.

In block 1504, the lifecycle management server 1204 identifies one or more firmware images 1306 for the controllers 1234 of the computing device 1202. The lifecycle management server 1204 stores firmware images 1306 for controllers 1234 in use by the computing devices 1202 of the system 1200. The firmware images 1306 may be provisioned, updated, and otherwise configured by an administrator of the system 1200. Thus, the lifecycle management server 1204 may provide a centralized source for updated firmware images 1306 for all computing devices 1202 in the system 1200.

In some embodiments, in block 1506, the lifecycle management server 1204 may match a firmware image 1306 to a controller 1234 of the computing device 1202. For example, the lifecycle management server 1204 may select the firmware image 1306 that is appropriate for the type, manufacturer, or other identity information of the controller 1234. In some embodiments, in block 1508 the lifecycle management server 1204 may identify a version of the firmware image 1306 based on the controller 1234 and/or the computing device 1202. For example, certain models, variants, manufacturers, or other types of controllers 1234 may require a particular version of a firmware image 1306. As another example, a particular computing device 1202 may require a particular version of the firmware image 1306 (e.g., a validated version of the firmware image 1306 or other version). The assignment of versions of firmware images 1306 to controllers 1234 and/or computing devices 1202 may be managed or otherwise configured by an administrator of the system 1200.

In some embodiments, in block 1510, the lifecycle management server 1204 may identify configuration data for the controllers 1234 and/or computing device 1202. As described above, the configuration data may be embodied as firmware variables (e.g., UEFI variables) or other configuration data used by a controller 1234 or other component of the computing device 1202. The configuration data may be managed or otherwise configured by an administrator of the system 1200.

After identifying firmware images 1306, in block 1512, the lifecycle management server 1204 transmits the identified firmware images 1306 to the computing device 1202. In some embodiments, in block 1514, the lifecycle management server 1204 may also transmit the identified configuration data to the computing device 1202. As described above in connection with FIG. 14, the computing device 1202 installs the firmware images 1306 and then proceeds to operate normally. After transmitting the firmware images and/or configuration data, the method 1500 loops back to block 1502 to continue processing connection requests from computing devices 1202.

EXAMPLES

Illustrative examples of the technologies disclosed herein are provided below. An embodiment of the technologies may include any one or more, and any combination of, the examples described below.

Example 1 includes a computing device for device lifecycle management, the computing device comprising: a first controller coupled to a first controller memory; one or more processors; and one or more memory devices having stored therein a plurality of instructions that, when executed by the one or more processors, cause the computing device to: load a boot environment in response to a start of a boot process of the computing device; connect, by the boot environment, to a lifecycle management server via a network connection in response to loading of the boot environment; download, by the boot environment, a first firmware image from the lifecycle management server via the network connection; and install, by the boot environment, the first firmware image to the first controller memory; wherein the first controller is to access the first firmware image in the first controller memory in response to installation of the first firmware image; and wherein the one or more memory devices have stored therein a plurality of instructions that, when executed by the one or more processors, further cause the computing device to continue the boot process of the computing device in response to the installation of the first firmware image.

Example 2 includes the subject matter of Example 1, and wherein the first controller memory comprises a random access volatile memory.

Example 3 includes the subject matter of any of Examples 1 and 2, and wherein the first controller memory comprises a byte addressable non-volatile memory.

Example 4 includes the subject matter of any of Examples 1-3, and wherein the first controller comprises a baseboard management controller, a manageability controller, a storage device controller, or a network interface controller.

Example 5 includes the subject matter of any of Examples 1-4, and wherein the first controller comprises a field-programmable gate array and the first firmware image comprises a bitstream image.

Example 6 includes the subject matter of any of Examples 1-5, and wherein the first firmware image comprises a platform firmware of the computing device.

Example 7 includes the subject matter of any of Examples 1-6, and further comprising a flash memory device, wherein to load the boot environment comprises to load the boot environment from the flash memory device.

Example 8 includes the subject matter of any of Examples 1-7, and wherein the one or more memory devices have stored therein a plurality of instructions that, when executed by the one or more processors, further cause the computing device to: download, by the boot environment, configuration data from the lifecycle management server via the network connection; and install, by the boot environment, the configuration data in response to downloading of the configuration data; wherein to continue the boot process comprises to continue the boot process in response to installation of the configuration data.

Example 9 includes the subject matter of any of Examples 1-8, and wherein the configuration data comprises a firmware variable.

Example 10 includes the subject matter of any of Examples 1-9, and further comprising: a second controller coupled to a second controller memory; wherein the one or more memory devices have stored therein a plurality of instructions that, when executed by the one or more processors, further cause the computing device to: (i) download, by the boot environment, a second firmware image from the lifecycle management server via the network connection and (ii) install, by the boot environment, the second firmware image to the second controller memory; and wherein the second controller is to access the second firmware image in the second controller memory in response to installation of the second firmware image.

Example 11 includes a computing device for device lifecycle management, the computing device comprising: one or more processors; and one or more memory devices having stored therein a plurality of instructions that, when executed by the one or more processors, cause the computing device to: receive a connection request from a remote computing device; identify a firmware image for a controller of the remote computing device in response to receipt of the connection request; and transmit the firmware image to the remote computing device.

Example 12 includes the subject matter of Example 11, and wherein to identify the firmware image comprises to select the firmware image from a plurality of firmware images based on an identity of the controller.

Example 13 includes the subject matter of any of Examples 11 and 12, and wherein to select the firmware image comprises to select a version of the firmware image based on the identity of the controller.

Example 14 includes the subject matter of any of Examples 11-13, and wherein to identify the firmware image comprises to select a version of the firmware image based on an identity of the remote computing device.

Example 15 includes the subject matter of any of Examples 11-14, and wherein: the image manager is further to identify configuration data for the remote computing device in response to the receipt of the connection request; and the connection manager is further to transmit the configuration data to the remote computing device.

Example 16 includes the subject matter of any of Examples 11-15, and wherein to identify the configuration data comprises to identify a firmware variable.

Example 17 includes the subject matter of any of Examples 11-16, and wherein the controller comprises a baseboard management controller, a manageability controller, a storage device controller, or a network interface controller of the remote computing device.

Example 18 includes the subject matter of any of Examples 11-17, and wherein the controller comprises a field-programmable gate array of the remote computing device, and the firmware image comprises a bitstream image.

Example 19 includes the subject matter of any of Examples 11-18, and wherein the firmware image comprises a platform firmware of the remote computing device.

Example 20 includes a method for device lifecycle management, the method comprising: loading, by a computing device, a boot environment in response to a start of a boot process of the computing device; connecting, by the boot environment, to a lifecycle management server via a network connection in response to loading the boot environment; downloading, by the boot environment, a first firmware image from the lifecycle management server via the network connection; installing, by the boot environment, the first firmware image to a first controller memory coupled to a first controller of the computing device; accessing, by the first controller, the first firmware image in the first controller memory in response to installing the first firmware image; and continuing, by the computing device, the boot process of the computing device in response to installing the first firmware image.

Example 21 includes the subject matter of Example 20, and wherein the first controller memory comprises a random access volatile memory.

Example 22 includes the subject matter of any of Examples 20 and 21, and wherein the first controller memory comprises a byte addressable non-volatile memory.

Example 23 includes the subject matter of any of Examples 20-22, and wherein the first controller comprises a baseboard management controller, a manageability controller, a storage device controller, or a network interface controller.

Example 24 includes the subject matter of any of Examples 20-23, and wherein the first controller comprises a field-programmable gate array and the first firmware image comprises a bitstream image.

Example 25 includes the subject matter of any of Examples 20-24, and wherein the first firmware image comprises a platform firmware of the computing device.

Example 26 includes the subject matter of any of Examples 20-25, and wherein loading the boot environment comprises loading the boot environment from a flash memory device of the computing device.

Example 27 includes the subject matter of any of Examples 20-26, and further comprising: downloading, by the boot environment, configuration data from the lifecycle management server via the network connection; and installing, by the boot environment, the configuration data in response to downloading the configuration data; wherein continuing the boot process comprises continuing to boot process in response to installing the configuration data.

Example 28 includes the subject matter of any of Examples 20-27, and wherein downloading the configuration data comprises downloading a firmware variable.

Example 29 includes the subject matter of any of Examples 20-28, and further comprising: downloading, by the boot environment, a second firmware image from the lifecycle management server via the network connection; installing, by the boot environment, the second firmware image to a second controller memory coupled to a second controller of the computing device; and accessing, by the second controller, the second firmware image in the second controller memory in response to installing the second firmware image.

Example 30 includes a method for device lifecycle management, the method comprising: receiving, by a computing device, a connection request from a remote computing device; identifying, by the computing device, a firmware image for a controller of the remote computing device in response to receiving the connection request; and transmitting, by the computing device, the firmware image to the remote computing device.

Example 31 includes the subject matter of Example 30, and wherein identifying the firmware image comprises selecting the firmware image from a plurality of firmware images based on an identity of the controller.

Example 32 includes the subject matter of any of Examples 30 and 31, and wherein selecting the firmware image comprises selecting a version of the firmware image based on the identity of the controller.

Example 33 includes the subject matter of any of Examples 30-32, and wherein identifying the firmware image comprises selecting a version of the firmware image based on an identity of the remote computing device.

Example 34 includes the subject matter of any of Examples 30-33, and further comprising: identifying, by the computing device, configuration data for the remote computing device in response to receiving the connection request; and transmitting, by the computing device, the configuration data to the remote computing device.

Example 35 includes the subject matter of any of Examples 30-34, and wherein identifying the configuration data comprises identifying a firmware variable.

Example 36 includes the subject matter of any of Examples 30-35 and wherein the controller comprises a baseboard management controller, a manageability controller, a storage device controller, or a network interface controller of the remote computing device.

Example 37 includes the subject matter of any of Examples 30-36, and wherein the controller comprises a field-programmable gate array of the remote computing device, and the firmware image comprises a bitstream image.

Example 38 includes the subject matter of any of Examples 30-37, and wherein the firmware image comprises a platform firmware of the remote computing device.

Example 39 includes a computing device comprising: a processor; and a memory having stored therein a plurality of instructions that when executed by the processor cause the computing device to perform the method of any of Examples 20-38.

Example 40 includes one or more non-transitory, computer readable storage media comprising a plurality of instructions stored thereon that in response to being executed result in a computing device performing the method of any of Examples 20-38.

Example 41 includes a computing device comprising means for performing the method of any of Examples 20-38.

Example 42 includes a computing device for device lifecycle management, the computing device comprising: a first controller coupled to a first controller memory; a boot environment; and a bootloader to load the boot environment in response to a start of a boot process of the computing device; wherein the boot environment is to (i) connect to a lifecycle management server via a network connection in response to loading of the boot environment, (ii) download a first firmware image from the lifecycle management server via the network connection, and (iii) install the first firmware image to the first controller memory; wherein the first controller is to access the first firmware image in the first controller memory in response to installation of the first firmware image; and wherein the bootloader is further to continue the boot process of the computing device in response to the installation of the first firmware image.

Example 43 includes the subject matter of Example 42, and wherein the first controller memory comprises a random access volatile memory.

Example 44 includes the subject matter of any of Examples 42 and 43, and wherein the first controller memory comprises a byte addressable non-volatile memory.

Example 45 includes the subject matter of any of Examples 42-44, and wherein the first controller comprises a baseboard management controller, a manageability controller, a storage device controller, or a network interface controller.

Example 46 includes the subject matter of any of Examples 42-45, and wherein the first controller comprises a field-programmable gate array and the first firmware image comprises a bitstream image.

Example 47 includes the subject matter of any of Examples 42-46, and wherein the first firmware image comprises a platform firmware of the computing device.

Example 48 includes the subject matter of any of Examples 42-47, and further comprising a flash memory device, wherein to load the boot environment comprises to load the boot environment from the flash memory device.

Example 49 includes the subject matter of any of Examples 42-48, and wherein: the boot environment is further to (i) download configuration data from the lifecycle management server via the network connection, and (ii) install the configuration data in response to downloading of the configuration data; and to continue the boot process comprises to continue the boot process in response to installation of the configuration data.

Example 50 includes the subject matter of any of Examples 42-49, and wherein the configuration data comprises a firmware variable.

Example 51 includes the subject matter of any of Examples 42-50, and further comprising: a second controller coupled to a second controller memory; wherein the boot environment is further to (i) download a second firmware image from the lifecycle management server via the network connection and (ii) install the second firmware image to the second controller memory; and the second controller is to access the second firmware image in the second controller memory in response to installation of the second firmware image.

Example 52 includes a computing device for device lifecycle management, the computing device comprising: connection manager circuitry to receive a connection request from a remote computing device; and image manager circuitry to identify a firmware image for a controller of the remote computing device in response to receipt of the connection request; wherein the connection manager circuitry is further to transmit the firmware image to the remote computing device.

Example 53 includes the subject matter of Example 52, and wherein to identify the firmware image comprises to select the firmware image from a plurality of firmware images based on an identity of the controller.

Example 54 includes the subject matter of any of Examples 52 and 53, and wherein to select the firmware image comprises to select a version of the firmware image based on the identity of the controller.

Example 55 includes the subject matter of any of Examples 52-54, and wherein to identify the firmware image comprises to select a version of the firmware image based on an identity of the remote computing device.

Example 56 includes the subject matter of any of Examples 52-55, and wherein: the image manager circuitry is further to identify configuration data for the remote computing device in response to the receipt of the connection request; and the connection manager circuitry is further to transmit the configuration data to the remote computing device.

Example 57 includes the subject matter of any of Examples 52-56, and wherein to identify the configuration data comprises to identify a firmware variable.

Example 58 includes the subject matter of any of Examples 52-57, and wherein the controller comprises a baseboard management controller, a manageability controller, a storage device controller, or a network interface controller of the remote computing device.

Example 59 includes the subject matter of any of Examples 52-58, and wherein the controller comprises a field-programmable gate array of the remote computing device, and the firmware image comprises a bitstream image.

Example 60 includes the subject matter of any of Examples 52-59, and wherein the firmware image comprises a platform firmware of the remote computing device.

Example 61 includes a computing device for device lifecycle management, the computing device comprising: means for loading a boot environment in response to a start of a boot process of the computing device; circuitry for connecting, by the boot environment, to a lifecycle management server via a network connection in response to loading the boot environment; circuitry for downloading, by the boot environment, a first firmware image from the lifecycle management server via the network connection; means for installing, by the boot environment, the first firmware image to a first controller memory coupled to a first controller of the computing device; means for accessing, by the first controller, the first firmware image in the first controller memory in response to installing the first firmware image; and circuitry for continuing the boot process of the computing device in response to installing the first firmware image.

Example 62 includes the subject matter of Example 61, and wherein the first controller memory comprises a random access volatile memory.

Example 63 includes the subject matter of any of Examples 61 and 62, and wherein the first controller memory comprises a byte addressable non-volatile memory.

Example 64 includes the subject matter of any of Examples 61-63, and wherein the first controller comprises a baseboard management controller, a manageability controller, a storage device controller, or a network interface controller.

Example 65 includes the subject matter of any of Examples 61-64, and wherein the first controller comprises a field-programmable gate array and the first firmware image comprises a bitstream image.

Example 66 includes the subject matter of any of Examples 61-65, and wherein the first firmware image comprises a platform firmware of the computing device.

Example 67 includes the subject matter of any of Examples 61-66, and wherein the means for loading the boot environment comprises means for loading the boot environment from a flash memory device of the computing device.

Example 68 includes the subject matter of any of Examples 61-67, and further comprising: circuitry for downloading, by the boot environment, configuration data from the lifecycle management server via the network connection; and means for installing, by the boot environment, the configuration data in response to downloading the configuration data; wherein the circuitry for continuing the boot process comprises circuitry for continuing to boot process in response to installing the configuration data.

Example 69 includes the subject matter of any of Examples 61-68, and wherein the circuitry for downloading the configuration data comprises circuitry for downloading a firmware variable.

Example 70 includes the subject matter of any of Examples 61-69, and further comprising: circuitry for downloading, by the boot environment, a second firmware image from the lifecycle management server via the network connection; means for installing, by the boot environment, the second firmware image to a second controller memory coupled to a second controller of the computing device; and means for accessing, by the second controller, the second firmware image in the second controller memory in response to installing the second firmware image.

Example 71 includes a computing device for device lifecycle management, the computing device comprising: circuitry for receiving a connection request from a remote computing device; means for identifying a firmware image for a controller of the remote computing device in response to receiving the connection request; and circuitry for transmitting the firmware image to the remote computing device.

Example 72 includes the subject matter of Example 71, and wherein the means for identifying the firmware image comprises means for selecting the firmware image from a plurality of firmware images based on an identity of the controller.

Example 73 includes the subject matter of any of Examples 71 and 72, and wherein the means for selecting the firmware image comprises means for selecting a version of the firmware image based on the identity of the controller.

Example 74 includes the subject matter of any of Examples 71-73, and wherein the means for identifying the firmware image comprises means for selecting a version of the firmware image based on an identity of the remote computing device.

Example 75 includes the subject matter of any of Examples 71-74, and further comprising: means for identifying configuration data for the remote computing device in response to receiving the connection request; and circuitry for transmitting the configuration data to the remote computing device.

Example 76 includes the subject matter of any of Examples 71-75, and wherein the means for identifying the configuration data comprises identifying a firmware variable.

Example 77 includes the subject matter of any of Examples 71-76, and wherein the controller comprises a baseboard management controller, a manageability controller, a storage device controller, or a network interface controller of the remote computing device.

Example 78 includes the subject matter of any of Examples 71-77, and wherein the controller comprises a field-programmable gate array of the remote computing device, and the firmware image comprises a bitstream image.

Example 79 includes the subject matter of any of Examples 71-78, and wherein the firmware image comprises a platform firmware of the remote computing device.

The invention claimed is:

1. A computing device comprising:
at least one controller of the of a plurality of controllers, the at least one controller is coupled to a controller memory; and
a bootloader to load a firmware environment in response to a start of a boot-up process of the computing device, wherein the firmware environment is to cause circuitry of the computing device to (i) download a firmware image from a management server via a network connection in response to loading of the firmware environment, and (ii) install the firmware image to the controller memory associated with the at least one controller of the plurality of controllers.

2. The computing device of claim 1, wherein the at least one controller of the plurality of controllers is to access the firmware image in the controller memory in response to installation of the firmware image.

3. The computing device of claim 1, wherein to load the firmware environment comprises to load a firmware boot environment.

4. The computing device of claim 1, wherein the controller memory comprises a random access volatile memory.

5. The computing device of claim 1, wherein the controller memory comprises a byte addressable non-volatile memory.

6. The computing device of claim 1, wherein the at least one controller of the plurality of controllers comprises a baseboard management controller, a manageability controller, a storage device controller, or a network interface controller.

7. The computing device of claim 1, wherein the controller comprises a field-programmable gate array and the firmware image comprises a bitstream image.

8. The computing device of claim 1, wherein the firmware image comprises one or more of: Unified Extensible Firmware Interface (UEFI) firmware driver, UEFI firmware application, or basic input/output system (BIOS) image.

9. The computing device of claim 1, wherein the computing device is to update the firmware image at least one more time after the boot-up.

10. A method for device management, the method comprising:
loading, by a bootloader of a computing device, a firmware environment in response to a start of a boot-up process of the computing device, wherein the computing device comprises a plurality of controllers;
downloading, by the firmware environment, a firmware image from a management server via a network connection in response to loading the firmware environment; and
installing, by the firmware environment, the firmware image to a controller memory associated with at least one controller of the plurality of controllers.

11. The method of claim 10, further comprising accessing, by the at least one controller, the firmware image in the controller memory in response to installing the firmware image.

12. The method of claim 10, wherein loading the firmware environment comprises loading a firmware boot environment.

13. The method of claim 10, wherein the controller memory comprises a random access volatile memory.

14. The method of claim 10, wherein the controller memory comprises a byte addressable non-volatile memory.

15. The method of claim 10, wherein the at least one controller comprises a field-programmable gate array and the firmware image comprises a bitstream image.

16. One or more non-transitory computer-readable storage media comprising a plurality of instructions stored thereon that, in response to being executed, cause a computing device to:
load a firmware environment by a bootloader of the computing device in response to a start of a boot-up process of the computing device, wherein the computing device comprises a plurality of controllers;
download, by the firmware environment, a firmware image from a management server via a network connection in response to loading the firmware environment; and
install, by the firmware environment, the firmware image to a controller memory coupled to at least one controller of the plurality of controllers.

17. The one or more computer-readable storage media of claim 16, further comprising a plurality of instructions stored thereon that, in response to being executed, cause the computing device to access, by the at least one controller, the firmware image in the controller memory in response to installing the firmware image.

18. The one or more computer-readable storage media of claim 16, wherein to load the firmware environment comprises to load a firmware boot environment.

19. The one or more computer-readable storage media of claim 16, wherein the controller memory comprises a random access volatile memory.

20. The one or more computer-readable storage media of claim 16, wherein the controller memory comprises a byte addressable non-volatile memory.

21. The one or more computer-readable storage media of claim 16, wherein the at least one controller of the plurality of controllers comprises a baseboard management controller, a manageability controller, a storage device controller, or a network interface controller.

22. The one or more computer-readable storage media of claim 16, wherein the controller comprises a field-programmable gate array and the firmware image comprises a bitstream image.

* * * * *

UNITED STATES PATENT AND TRADEMARK OFFICE
CERTIFICATE OF CORRECTION

PATENT NO. : 11,354,053 B2
APPLICATION NO. : 17/005879
DATED : June 7, 2022
INVENTOR(S) : Murugasamy K. Nachimuthu and Mohan J. Kumar It is certified that error appears in the above-identified patent and that said Letters Patent is hereby corrected as shown below:

In the Claims

Column 23, Lines 8-20 Claim 1 should read:
1. A computing device comprising:
    at least one controller of a plurality of controllers, the at least one controller is coupled to a controller memory; and
    a bootloader to load a firmware environment in response to a start of a boot-up process of the computing device,
    wherein the firmware environment is to cause circuitry of the computing device to (i) download a firmware image from a management server via a network connection in response to loading of the firmware environment, and (ii) install the firmware image to the controller memory associated with the at least one controller of the plurality of controllers.

Signed and Sealed this
Twenty-second Day of November, 2022

Katherine Kelly Vidal
*Director of the United States Patent and Trademark Office*